(12) United States Patent
Kawanishi et al.

(10) Patent No.: US 12,189,568 B2
(45) Date of Patent: Jan. 7, 2025

(54) COMMUNICATION APPARATUS AND COMMUNICATION METHOD

(71) Applicant: SONY SEMICONDUCTOR SOLUTIONS CORPORATION, Kanagawa (JP)

(72) Inventors: Kohei Kawanishi, Kanagawa (JP); Tadaaki Yuba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 8 days.

(21) Appl. No.: 17/998,505

(22) PCT Filed: May 12, 2021

(86) PCT No.: PCT/JP2021/017984
§ 371 (c)(1),
(2) Date: Nov. 11, 2022

(87) PCT Pub. No.: WO2021/241220
PCT Pub. Date: Dec. 2, 2021

(65) Prior Publication Data
US 2023/0259485 A1 Aug. 17, 2023

(30) Foreign Application Priority Data
May 26, 2020 (JP) .................. 2020-091642

(51) Int. Cl.
*G06F 13/42* (2006.01)
*H04L 12/40* (2006.01)
(52) U.S. Cl.
CPC .......... *G06F 13/4291* (2013.01); *H04L 12/40* (2013.01); *G06F 2213/0016* (2013.01)

(58) Field of Classification Search
CPC ......... G06F 13/4291; G06F 2213/0016; H04L 12/40
See application file for complete search history.

(56) References Cited

U.S. PATENT DOCUMENTS 6,819,657 B1 * 11/2004 Varma .................. H04L 1/0025
370/278
2007/0072638 A1 * 3/2007 Yang ..................... H04W 52/50
455/522

(Continued)

FOREIGN PATENT DOCUMENTS

EP          3203750 A1 * 8/2017 ......... H04N 21/4122
JP     2000-151641 A     5/2000
(Continued)

OTHER PUBLICATIONS

International Search Report and Written Opinion of PCT Application No. PCT/JP2021/017984, issued on Jul. 27, 2021, 09 pages of ISRWO.

*Primary Examiner* — Glenn A. Auve
(74) *Attorney, Agent, or Firm* — CHIP LAW GROUP

(57) ABSTRACT

The present disclosure relates to a communication apparatus, a communication method, and a program that enable more reliable communication. An I3C master transmits a parameter having been changed to an I3C slave during communication in Sync Mode with the I3C slave, and gives an instruction on a timing at which the parameter having been changed is reflected in the I3C slave by transmitting a predetermined command. The I3C slave holds the parameter having been changed, the parameter being received during communication in Sync Mode with the I3C master, and determines to reflect the parameter having been changed at a timing at which the predetermined command is transmitted from the I3C master. The present technology can be applied to, for example, an I3C bus.

16 Claims, 23 Drawing Sheets

(56) References Cited

U.S. PATENT DOCUMENTS

| | | | |
|---|---|---|---|
| 2012/0026882 A1* | 2/2012 | Park | H04W 28/24 370/235 |
| 2014/0223026 A1* | 8/2014 | Tamir | H04L 67/1097 709/235 |
| 2016/0226709 A1* | 8/2016 | Chen | H04B 17/318 |

FOREIGN PATENT DOCUMENTS

| | | |
|---|---|---|
| JP | 2008199292 A | 8/2008 |
| JP | 2018-054502 A | 4/2018 |
| JP | 2018-534688 A | 11/2018 |

\* cited by examiner

FIG. 18

| TU | | Unit (GRANULARITY) | DT[6:0].max | NOTE |
|---|---|---|---|---|
| [7] | [6:0] | | | |
| 1'b0 | 7'h00 | Private Contract | | Unit = 10^(TU-1) [us] |
| | 7'h01 | 1 [ns] | 127 [ns] | |
| | 7'h02 | 10 [ns] | 1.27 [us] | |
| | 7'h03 | 100 [ns] | 12.7 [us] | |
| | 7'h04 | 1 [us] | 127 [us] | |
| | .. | .. | .. | |
| | 7'h7F | 10^126 [ns] | | |
| 1'b1 | 7'h00 | Private Contract | | Unit = MOST SIGNIFICANT Inc[ns] |
| | 7'h01 | 1 [ns] | 127 [ns] | |
| | 7'h02 | 2 [ns] | 254 [ns] | |
| | .. | .. | .. | |
| | 7'h0A | 10 [ns] | 1.27 [us] | |
| | 7'h0B | 20 [ns] | 2.54 [us] | |
| | .. | .. | .. | |
| | 7'h13 | 100 [ns] | 12.7 [us] | |
| | 7'h14 | 200 [ns] | 25.4 [us] | |
| | .. | .. | .. | |

FIG. 19

Unit = TU [ns]   ([us] IS POSSIBLE)

| TU [7:0] | Unit (GRANULARITY) | DT[6:0].max |
|---|---|---|
| 8'h00 | Private Contract | |
| 8'h01 | 1[ns] | 127[ns] |
| 8'h02 | 2[ns] | 254[ns] |
| 8'h03 | 3[ns] | 381[ns] |
| 8'h04 | 4[ns] | 508[ns] |
| ⋮ | ⋮ | ⋮ |
| 8'hFF | 255[ns] | 32.385[us] |

FIG. 20

Unit = 2*TU [ns]   ([us] IS POSSIBLE)

| TU [7:0] | Unit (GRANULARITY) | DT[6:0].max |
|---|---|---|
| 8'h00 | Private Contract | |
| 8'h01 | 2[ns] | 254[ns] |
| 8'h02 | 4[ns] | 508[ns] |
| 8'h03 | 6[ns] | 762[ns] |
| 8'h04 | 8[ns] | 1.16[us] |
| ⋮ | ⋮ | ⋮ |
| 8'hFF | 510[ns] | 64.770[us] |

FIG. 21

Unit = $2^{(TU-1)}$ [ns]

| TU [7:0] | Unit (GRANULARITY) | DT[6:0].max |
|---|---|---|
| 8'h00 | Private Contract | |
| 8'h01 | 1[ns] | 127[ns] |
| 8'h02 | 2[ns] | 254[ns] |
| 8'h03 | 4[ns] | 508[ns] |
| 8'h04 | 8[ns] | 1.16[us] |
| ⋮ | ⋮ | ⋮ |
| 8'hFF | 2^254[ns] | ABOUT 100 MILLION YEARS |

FIG. 22

Unit = $10^{(TU-1)}$ [ns]

| TU [7:0] | Unit (GRANULARITY) | DT[6:0].max |
|---|---|---|
| 8'h00 | Private Contract | |
| 8'h01 | 1[ns] | 127[ns] |
| 8'h02 | 10[ns] | 1.27[us] |
| 8'h03 | 100[ns] | 12.7[us] |
| 8'h04 | 1[us] | 127[us] |
| ⋮ | ⋮ | ⋮ |
| 8'hFF | 10^254[ns] | ... |

FIG. 23

Unit = MOST SIGNIFICANT Inc [ns]

| TU [7:0] | Unit (GRANULARITY) | DT[6:0].max |
|---|---|---|
| 8'h00 | Private Contract | |
| 8'h01 | 1 [ns] | 127 [ns] |
| 8'h02 | 2 [ns] | 254 [ns] |
| ⋮ | ⋮ | ⋮ |
| 8'hA | 10 [ns] | 1.27 [us] |
| 8'hB | 20 [ns] | 2.54 [us] |
| ⋮ | ⋮ | ⋮ |
| 8'h13 | 100 [ns] | 12.7 [us] |
| 8'h14 | 200 [ns] | 25.4 [us] |
| ⋮ | ⋮ | ⋮ |
| 8'h1C | 1 [us] | 127 [us] |
| 8'h1D | 2 [us] | 254 [us] |
| ⋮ | ⋮ | ⋮ |
| 8'h25 | 10 [us] | 1.27 [ms] |
| 8'h26 | 20 [us] | 2.54 [ms] |
| ⋮ | ⋮ | ⋮ |
| 8'h3E | 8 [ms] | 1.016 [s] |
| ⋮ | ⋮ | ⋮ |

FIG. 24

| T_Ph | Sequence Repetition Period | T_Ph | Sequence Repetition Period | T_Ph | Sequence Repetition Period |
|---|---|---|---|---|---|
| 8'h00 | — | 8'h10 | 200[us] | 8'h20 | 9[ms] |
| 8'h01 | 5[ns] | 8'h11 | 300[us] | 8'h21 | 10[ms] |
| 8'h02 | 6[us] | 8'h12 | 400[us] | 8'h22 | 20[ms] |
| 8'h03 | 7[us] | 8'h13 | 500[us] | 8'h23 | 30[ms] |
| 8'h04 | 8[us] | 8'h14 | 600[us] | 8'h24 | 40[ms] |
| 8'h05 | 9[us] | 8'h15 | 700[us] | 8'h25 | 50[ms] |
| 8'h06 | 10[us] | 8'h16 | 800[us] | 8'h26 | 60[ms] |
| 8'h07 | 20[us] | 8'h17 | 900[us] | 8'h27 | 70[ms] |
| 8'h08 | 30[us] | 8'h18 | 1[ms] | 8'h28 | 80[ms] |
| 8'h09 | 40[us] | 8'h19 | 2[ms] | 8'h29 | 90[ms] |
| 8'h0A | 50[us] | 8'h1A | 3[ms] | 8'h2A | 100[ms] |
| 8'h0B | 60[us] | 8'h1B | 4[ms] | 8'h2B | 200[ms] |
| 8'h0C | 70[us] | 8'h1C | 5[ms] | 8'h2C | 300[ms] |
| 8'h0D | 80[us] | 8'h1D | 6[ms] | 8'h2D | 400[ms] |
| 8'h0E | 90[us] | 8'h1E | 7[ms] | 8'h2E | 500[ms] |
| 8'h0F | 100[us] | 8'h1F | 8[ms] | 8'h2F | 600[ms] |

| T_Ph | Sequence Repetition Period |
|---|---|
| 8'h30 | 700[ms] |
| 8'h31 | 800[ms] |
| 8'h32 | 900[ms] |
| 8'h33 | 1[s] |
| 8'h34 | 2[s] |
| 8'h35 | 3[s] |
| 8'h36 | 4[s] |
| 8'h37 | 5[s] |
| 8'h38 | 6[s] |
| 8'h39 | 7[s] |
| 8'h3A | 8[s] |
| 8'h3B | 9[s] |
| 8'h3C | 10[s] |
| 8'h3D | 11[s] |
| 8'h3E | 12[s] |
| ... | ... |

COMMUNICATION APPARATUS AND COMMUNICATION METHOD

CROSS REFERENCE TO RELATED APPLICATIONS

This application is a U.S. National Phase of International Patent Application No. PCT/JP2021/017984 filed on May 12, 2021, which claims priority benefit of Japanese Patent Application No. JP 2020-091642 filed in the Japan Patent Office on May 26, 2020. Each of the above-referenced applications is hereby incorporated herein by reference in its entirety.

TECHNICAL FIELD

The present disclosure relates to a communication apparatus, a communication method, and a program, and particularly, to a communication apparatus, a communication method, and a program that enable more reliable communication.

BACKGROUND ART

Conventionally, an inter-integrated circuit (I2C) standard has been widely adopted as a bus interface (IF) for controlling registers in various devices. In recent years, it has been required to implement high-speed and multi-functionalized I2C, and a definition of an improved inter integrated circuit (I3C) has been formulated by a mobile industry processor interface (MIPI) alliance as a next-generation standard, and revision of I3C is in progress. For example, I2C and I3C are configured to be able to communicate with a slave connected to the bus IF in accordance with control by a master having an initiative of communication via the bus IF.

Here, Patent Document 1 discloses a method of accurately maintaining synchronization by using a delay time message indicating a time delay between a start of a synchronization period and an actual transmission time of a synchronization message.

CITATION LIST

Patent Document

Patent Document 1: Japanese Patent Application Laid-Open No. 2018-534688

SUMMARY OF THE INVENTION

Problems to be Solved by the Invention

Meanwhile, the synchronization message and the delay time message disclosed in Patent Document 1 described above match ST and DT defined in synchronization in Sync Mode, respectively, in I3C. However, changing a parameter (for example, TU/DT/ODR/Tph) that has already been set in Sync Mode is not described in the standard of I3C, and a method of changing the parameter is unclear. Therefore, in a case where a parameter that has already been set is dynamically changed in the middle of Sync Mode, there is a concern that a malfunction may occur, and there is a possibility that communication cannot be reliably performed.

The present disclosure has been made in view of such a situation, and is intended to enable more reliable communication.

Solutions to Problems

A communication apparatus according to a first aspect of the present disclosure includes a parameter transmitter that transmits a parameter having been changed to a communication apparatus of a counterpart side during communication in a synchronous mode with the communication apparatus of the counterpart side that performs dependent communication, and a command transmitter that gives an instruction, by transmitting a predetermined command, on a timing at which the parameter having been changed is reflected in the communication apparatus of the counterpart side.

A communication method or a program according to the first aspect of the present disclosure includes transmitting a parameter having been changed to a communication apparatus of a counterpart side during communication in Sync Mode with the communication apparatus of the counterpart side, and giving an instruction, by transmitting a predetermined command, on a timing at which the parameter having been changed is reflected in the communication apparatus of the counterpart side.

In the first aspect of the present disclosure, the parameter having been changed is transmitted to the communication apparatus of the counterpart side during communication in Sync Mode with the communication apparatus of the counterpart side, and an instruction on the timing at which the parameter having been changed is reflected in the communication apparatus of the counterpart side is given by transmitting the predetermined command.

A communication apparatus according to a second aspect of the present disclosure includes a parameter holder that holds a parameter having been changed, the parameter being received during communication in a synchronous mode with a communication apparatus of a counterpart side having an initiative of communication, and a parameter reflection determiner that determines to reflect the parameter having been changed at a timing at which a predetermined command is transmitted from the communication apparatus of the counterpart side.

A communication method or a program according to the second aspect of the present disclosure includes holding a parameter having been changed, the parameter being received during communication in a synchronous mode with a communication apparatus of a counterpart side having an initiative of communication, and determining to reflect the parameter having been changed at a timing at which a predetermined command is transmitted from the communication apparatus of the counterpart side.

A communication method or a program according to the second aspect of the present disclosure includes holding the parameter having been changed, the parameter being received during communication in a synchronous mode with the communication apparatus of the counterpart side having the initiative of communication, and determining to reflect the parameter having been changed at the timing at which the predetermined command is transmitted from the communication apparatus of the counterpart side.

BRIEF DESCRIPTION OF DRAWINGS

FIG. 18 is a diagram illustrating a first example of a time unit table that defines a parameter TU for delay time.

FIG. 19 is a diagram illustrating a second example of the time unit table that defines the parameter TU for delay time.

FIG. 20 is a diagram illustrating a third example of the time unit table that defines the parameter TU for delay time.

FIG. 21 is a diagram illustrating a fourth example of the time unit table that defines the parameter TU for delay time.

FIG. 22 is a diagram illustrating a fifth example of the time unit table that defines the parameter TU for delay time.

FIG. 23 is a diagram illustrating a sixth example of the time unit table that defines the parameter TU for delay time.

FIG. 24 is a diagram illustrating an example of a time unit table that defines a parameter Tph in the Sync Mode operation.

MODE FOR CARRYING OUT THE INVENTION

Hereinafter, a specific embodiment to which the present technology is applied will be described in detail with reference to the drawings.

<Configuration Example of Bus IF>

Figure 1:
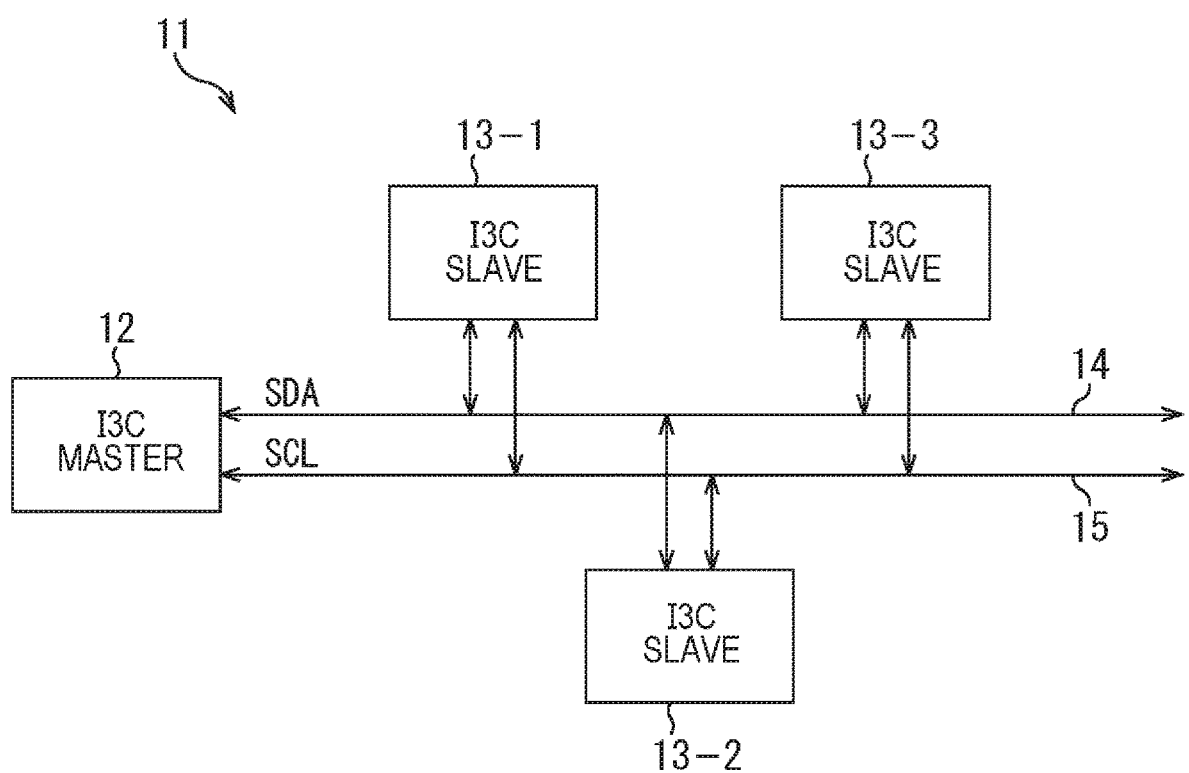
FIG. 1 is a block diagram illustrating a configuration example of one embodiment of an I3C bus to which the present technology is applied.

FIG. 1 is a block diagram illustrating a configuration example of one embodiment of an I3C bus to which the present technology is applied.

An I3C bus 11 illustrated in FIG. 1 is configured by connecting an I3C master 12 and three I3C slaves 13-1 to 13-3 via a data signal line 14 that transmits serial data SDA and a clock signal line 15 that transmits a serial clock SCL.

The I3C master 12 has an initiative in communication on the I3C bus 11 and controls communication with the I3C slaves 13-1 to 13-3 via the data signal line 14 and the clock signal line 15.

The I3C slaves 13-1 to 13-3 can perform communication via the I3C bus 11 under the control of the I3C master 12. Note that, hereinafter, in a case where it is unnecessary to distinguish the I3C slaves 13-1 to 13-3 from each other, the I3C slaves are simply referred to as the I3C slaves 13.

In the I3C bus 11 configured as described above, communication conforming to a standard of the I3C is performed.

A command on the I3C bus 11 will be described with reference to FIG. 2.

Figure 2:
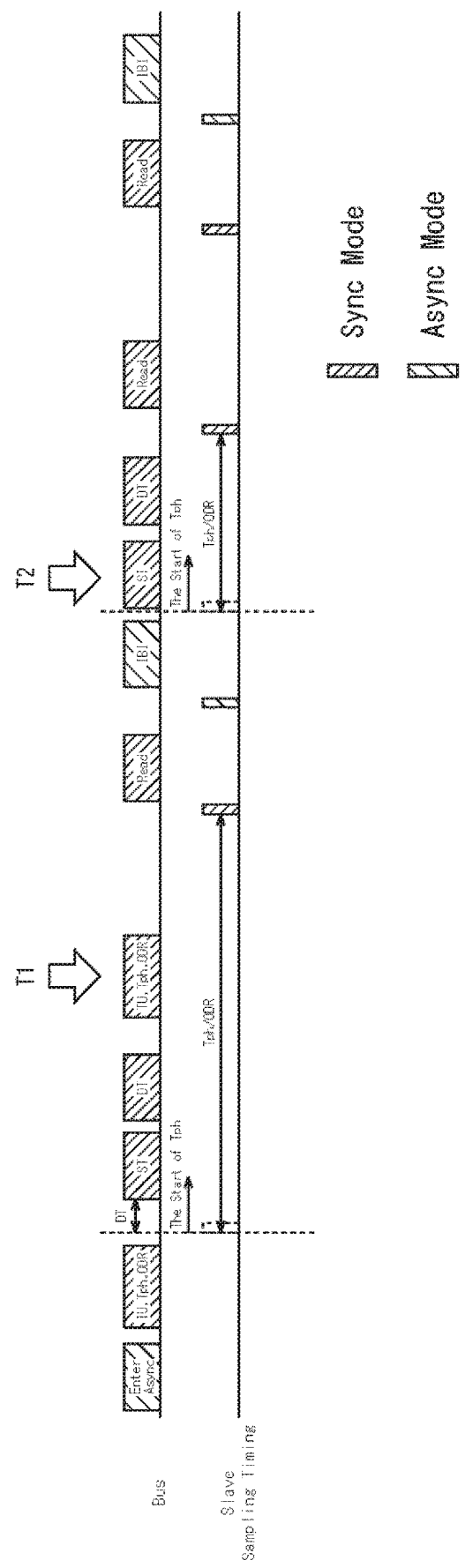
FIG. 2 is a diagram for describing a command on the I3C bus.

FIG. 2 illustrates a state of the I3C bus 11 and a timing at which the I3C slave 13 performs sampling.

For example, the I3C master 12 transmits a command Enter Async giving an instruction to start synchronization in Async Mode to the I3C slave 13. Subsequently, the I3C master 12 transmits a parameter TU, a parameter Tph, and a parameter ODR to the I3C slave 13. In response to the transmission, the I3C slave 13 performs various settings based on the parameter TU, the parameter Tph, and the parameter ODR, and reflects setting values of the settings.

Thereafter, at a timing at which a delay time DT has elapsed from a start of a time set by the parameter Tph, the I3C master 12 transmits a command ST giving an instruction to start synchronization in Sync Mode to the I3C slave 13, and then transmits a parameter DT for setting a delay time to the I3C slave 13.

Then, the I3C master 12 transmits the parameter TU, the parameter Tph, and the parameter ODR to the I3C slave 13 at an arbitrary timing T1 in a time zone in which the I3C bus 11 is free. At this time, the I3C slave 13 holds the parameter TU, the parameter Tph, and the parameter ODR to the I3C slave 13.

Furthermore, the time set by the parameter Tph/ODR elapses after the start of the time set by the parameter Tph, and the I3C slave 13 acquires data. Then, the I3C master 12 transmits a read command to the I3C slave 13, and data is transmitted and received between the I3C master 12 and the I3C slave 13 by in-band interrupt (IBI) in Async Mode.

Then, the I3C master 12 transmits the command ST to the I3C slave 13 to give an instruction to start synchronization in Sync Mode, and immediately at a timing T2, the I3C slave 13 reflects the held parameter TU, parameter Tph, and parameter ODR. That is, the I3C slave 13 can change the parameters with the command ST as a sign without ending (EXIT) Async Mode.

Therefore, in the I3C bus 11, it is possible to more reliably perform the communication between the I3C master 12 and the I3C slave 13 while avoiding occurrence of a malfunction.

Figure 3:
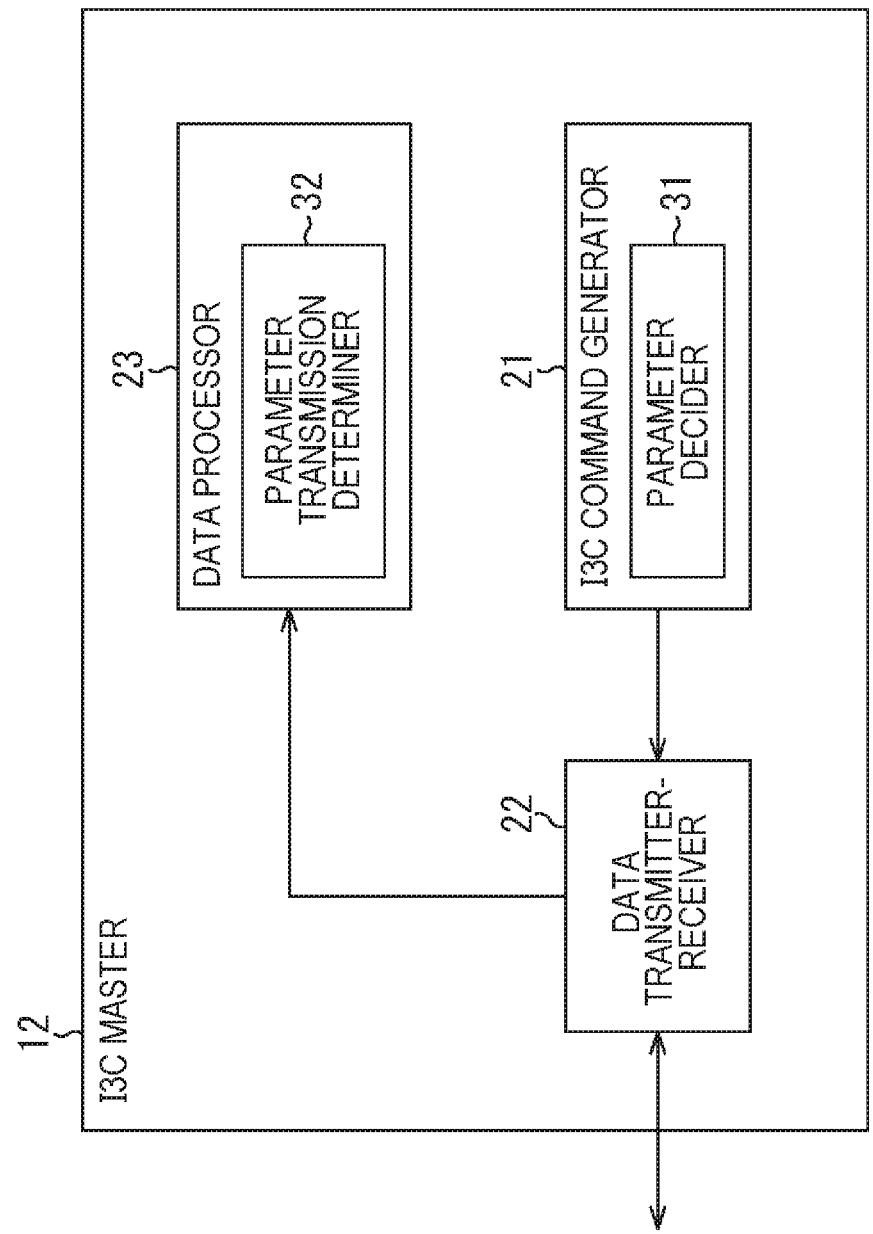
FIG. 3 is a block diagram illustrating a configuration example of an I3C master.

FIG. 3 is a block diagram illustrating a configuration example of the I3C master 12.

As illustrated in FIG. 3, the I3C master 12 includes an I3C command generator 21, a data transmitter-receiver 22, and a data processor 23. Furthermore, the I3C command generator 21 includes a parameter decider 31, and the data processor 23 includes a parameter transmission determiner 32. Note that, in the I3C master 12 illustrated in FIG. 3, only blocks necessary for the I3C communication with the I3C slave 13 are illustrated, and illustration of the other blocks is omitted.

The I3C command generator 21 generates a command for setting various parameters decided by the parameter decider 31 in the I3C slave 13, and supplies the command to the data transmitter-receiver 22. For example, the parameter decider 31 decides parameters such as a parameter TU for setting a time unit, the parameter Tph for setting a repetition time of a procedure, and the parameter ODR for setting a data output rate.

The data transmitter-receiver 22 transmits ad receives data to and from a data transmitter-receiver 41 (FIG. 4) of the I3C slave 13, and transmits, for example, a command and a parameter supplied from the I3C command generator 21 to the I3C slave 13. In addition, the data transmitter-receiver 22 receives data transmitted from the I3C slave 13 and supplies the data to the data processor 23.

The data processor 23 performs various data processing on the data of the I3C slave 13 supplied from the data transmitter-receiver 22. For example, in the data processor 23, the parameter transmission determiner 32 performs determination processing of determining whether or not to transmit the parameter from the I3C master 12 to the I3C slave 13.

Figure 4:
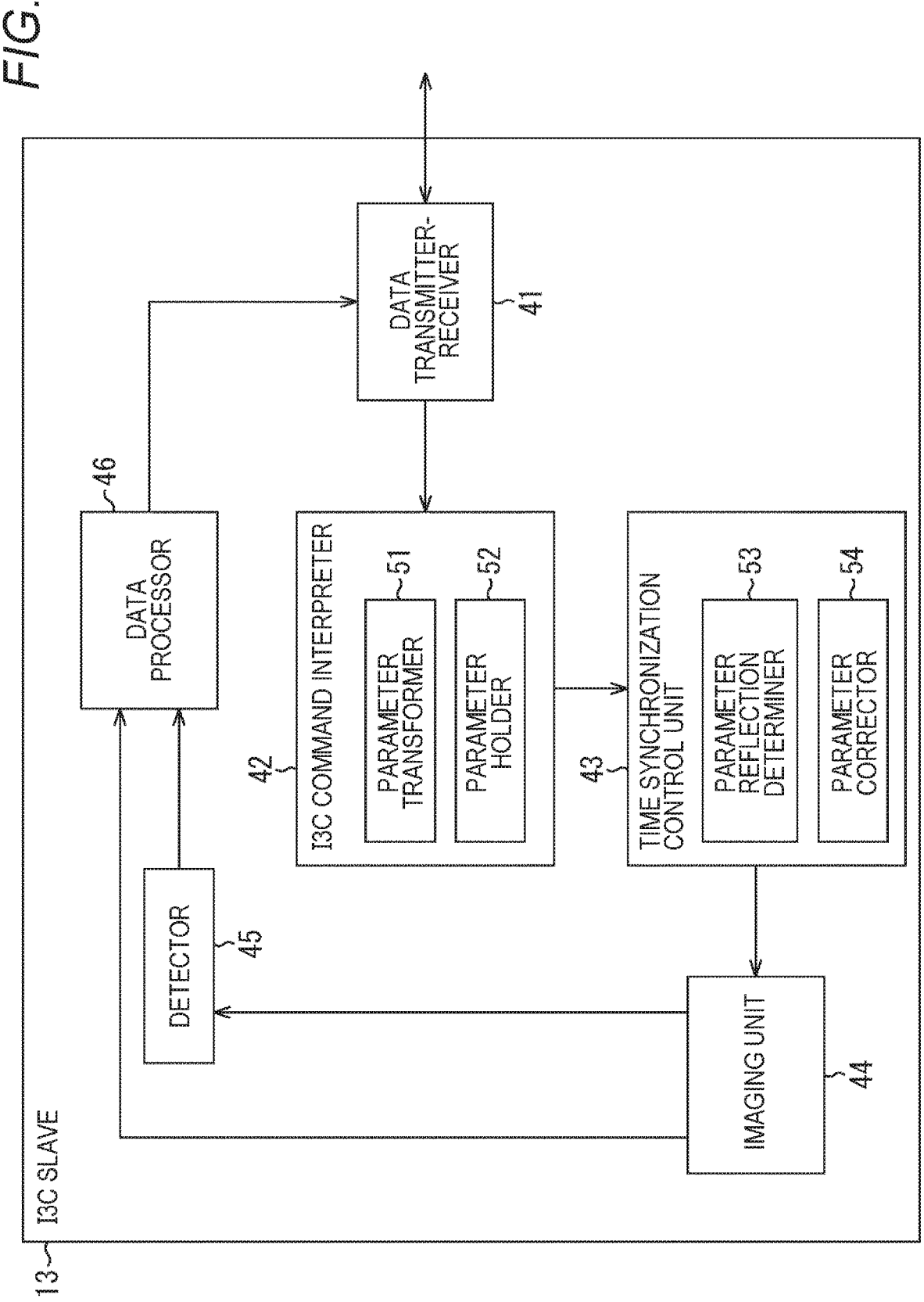
FIG. 4 is a block diagram illustrating a configuration example of an I3C slave.

FIG. 4 is a block diagram illustrating a configuration example of the I3C slave 13.

As illustrated in FIG. 4, the I3C slave 13 includes the data transmitter-receiver 41, an I3C command interpreter 42, a time synchronization control unit 43, an imaging unit 44, a detector 45, and a data processor 46. Furthermore, the I3C command interpreter 42 includes a parameter transformer 51 and a parameter holder 52, and the time synchronization control unit 43 includes a parameter reflection determiner 53 and a parameter corrector 54.

The data transmitter-receiver 41 transmits and receives data to and from the data transmitter-receiver 22 of the I3C master 12, and for example, receives a command and a parameter transmitted from the I3C master 12 and supplies the command and the parameter to the I3C command interpreter 42.

The I3C command interpreter 42 interprets the command transmitted from I3C master 12 and supplied through the data transmitter-receiver 41. Then, the I3C command interpreter 42 causes the parameter transformer 51 to transform the parameter into a reference value in the I3C slave 13 in accordance with the interpreted command, and the parameter holder 52 holds the parameter. In addition, the I3C command interpreter 42 supplies the parameter held in the parameter holder 52 to the time synchronization control unit 43 at a predetermined timing.

The time synchronization control unit 43 performs control to synchronize time with the I3C master 12 on the basis of the parameter supplied from the I3C command interpreter 42. For example, the time synchronization control unit 43 causes the parameter reflection determiner 53 to determine whether or not to reflect the parameter, and causes the parameter corrector 54 to correct the parameter as appropriate.

The imaging unit 44 supplies an image obtained by performing imaging at a timing according to the control by the time synchronization control unit 43 to the detector 45 and the data processor 46.

In a case where a target object is included in the image supplied from the imaging unit 44, the detector 45 supplies data indicating a detection result of detecting the target object to the data processor 46.

The data processor 46 performs data processing on the image captured by the imaging unit 44 and the data indicating the detection result by the detector 45, and transmits the data to the I3C master 12 via the data transmitter-receiver 41 as necessary.

<Method of Changing Parameter>

Figure 5:
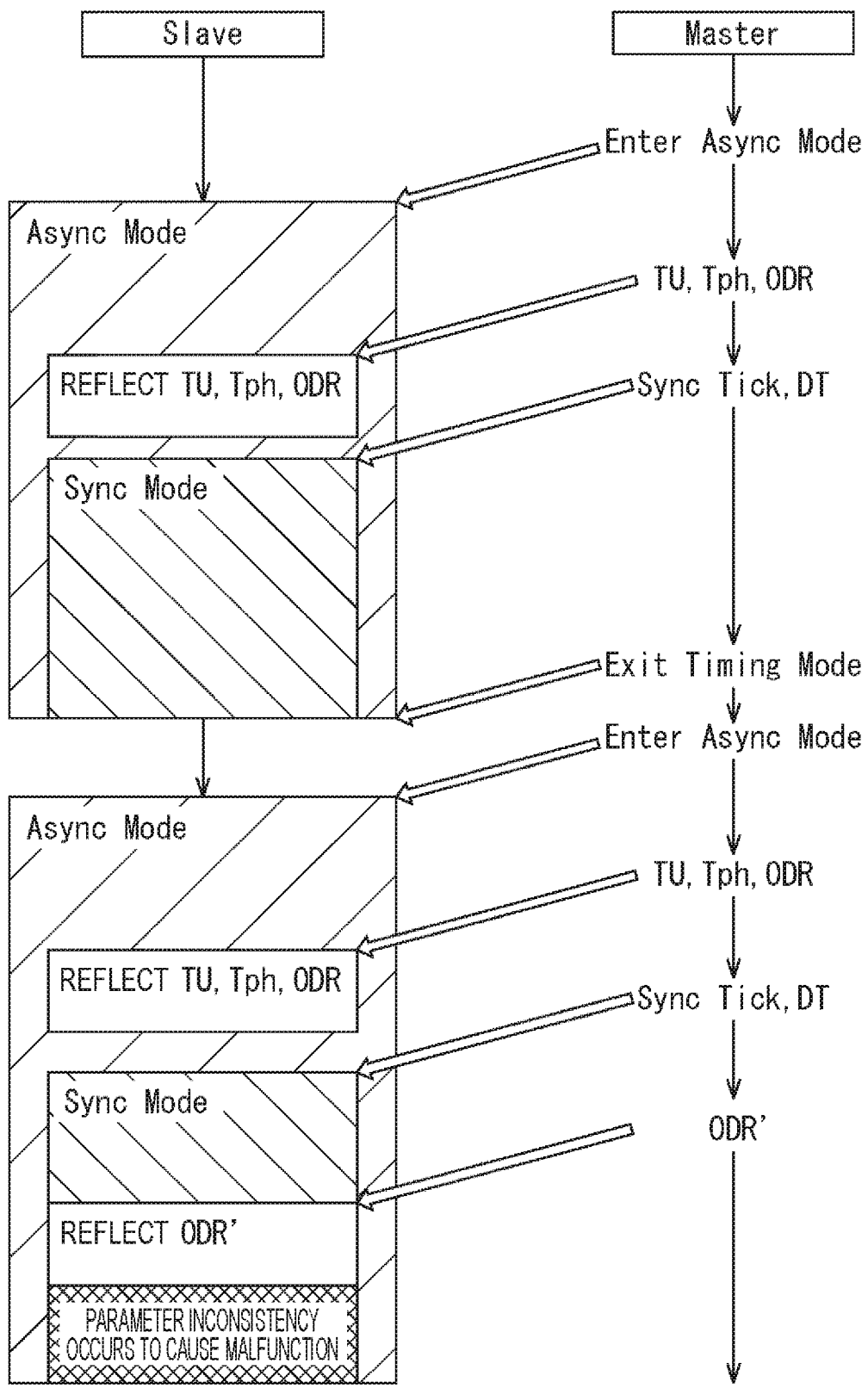
FIG. 5 is a diagram for describing a method of changing a parameter of Sync Mode during use of Async Mode without changing a current standard.

With reference to FIG. 5, a method of changing a parameter of Sync Mode during use of Async Mode without changing a current standard will be described.

First, the I3C master 12 transmits the command Enter Async Mode giving an instruction to start Async Mode, and then, the I3C slave 13 starts Async Mode. Subsequently, the I3C master 12 transmits the parameter TU, the parameter Tph, the parameter ODR, and then, the I3C slave 13 reflects the setting values according to these parameters. Thereafter, the I3C master 12 issues a command Sync Tick giving an instruction to start synchronization in Sync Mode and the parameter DT, and then, the I3C slave 13 starts Sync Mode.

Then, in a case where the parameter is changed, the I3C master 12 transmits a command Exit Timing Mode giving an instruction on an end to synchronization. In response, after the I3C slave 13 finishes both Async Mode and Sync Mode, the I3C master 12 again sends a command Enter Async Mode to start Async Mode. Subsequently, the I3C master 12 transmits the parameter TU, parameter Tph, and parameter ODR having been changed, and then, the I3C slave 13 reflects the setting values according to the parameters having been changed. Thereafter, the I3C master 12 issues the command Sync Tick and the parameter DT, and then, the I3C slave 13 starts Sync Mode.

As described above, in the current standard, the parameter is reflected at a timing at which the parameter is transmitted from the I3C master 12 to the I3C slave 13. Therefore, in a case where the parameter is changed, it is necessary to end Async Mode and Sync Mode, start Async Mode again, and transmit the parameter having been changed.

For example, in the current standard, in a case where a parameter ODR' having been changed is transmitted while Sync Mode is kept, inconsistency occurs to cause a malfunction.

Figure 6:
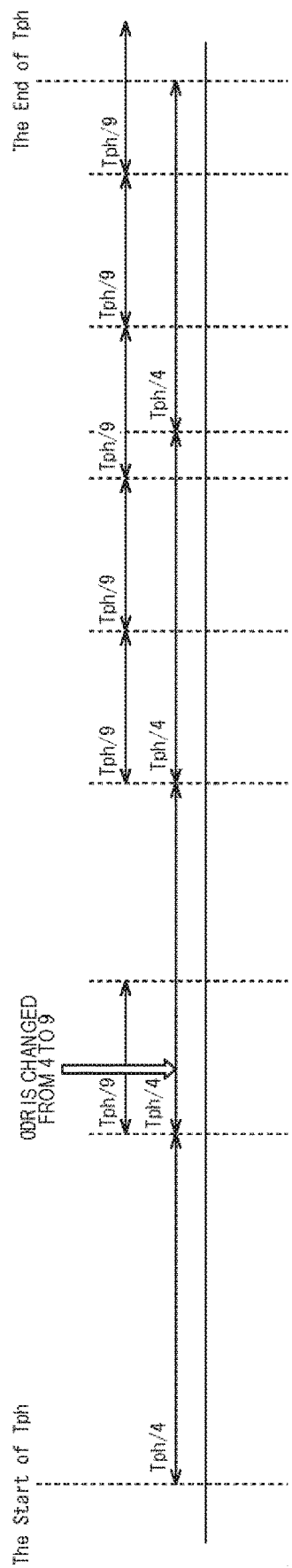
FIG. 6 is a diagram for describing an example in which parameter consistency cannot be obtained.

With reference to FIG. 6, a description will be made of processing of changing a setting value of the parameter ODR for setting the data output rate from ODR=4 to ODR=9 as an example in which parameter consistency cannot be obtained.

As illustrated in FIG. 6, when the parameter ODR of the setting value ODR=9 is supplied at a timing indicated by a hollow arrow while communication in Sync Mode is performed with the setting value ODR=4 of the parameter ODR, it is unclear whether the setting value ODR=9 is reflected from this section or the setting value ODR=9 is reflected from the next section in the current standard. Therefore, in a case where the setting value of the parameter ODR is changed in the middle of Sync Mode, consistency cannot be obtained at an end time of Tph as illustrated at the right end in the drawing.

As described above, in a case where the parameter is changed in the middle of Sync Mode, for example, consistency may not be obtained at the end time of Tph, and there is a concern that communication cannot be reliably performed due to occurrence of a malfunction.

Therefore, the present embodiment proposes a method of changing a parameter in the middle of Sync Mode while avoiding occurrence of such a malfunction.

Figure 7:
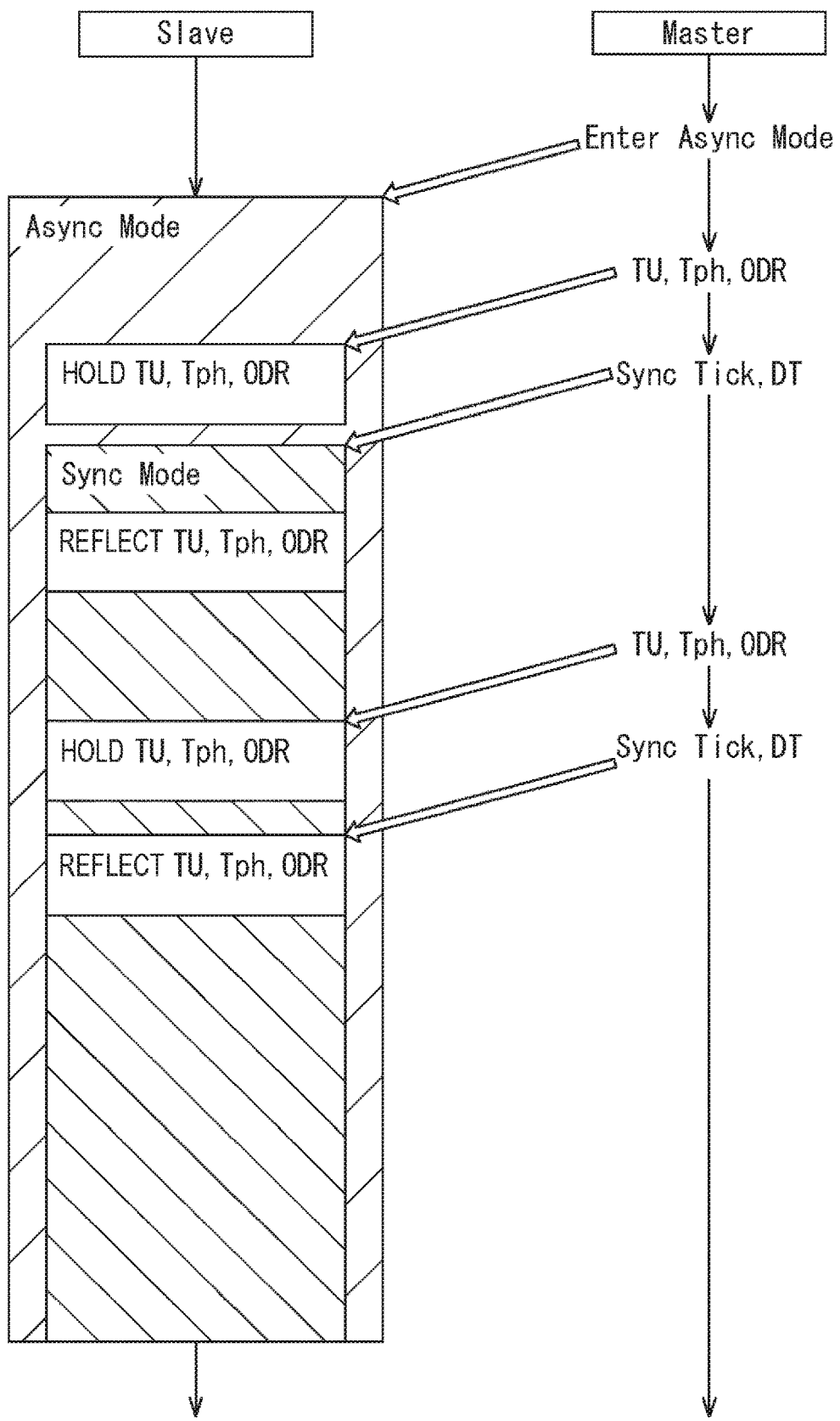
FIG. 7 is a diagram for describing a method of dynamically changing a setting parameter in the middle of Sync Mode during use of Async Mode.

A method of dynamically changing a setting parameter in the middle of Sync Mode during use of Async Mode will be described with reference to FIG. 7.

First, the I3C master 12 transmits the command Enter Async Mode generated by the I3C command generator 21 to the I3C slave 13 via the data transmitter-receiver 22. The I3C slave 13 starts Async Mode by the time synchronization control unit 43 performing control to synchronize the time in accordance with the command Enter Async Mode received by the data transmitter-receiver 41.

Next, the I3C master 12 transmits the parameter TU, the parameter Tph, and the parameter ODR decided by the parameter decider 31 to the I3C slave 13 via the data transmitter-receiver 22. The I3C slave 13 transforms (converts) the parameter TU, the parameter Tph, and the parameter ODR received by the data transmitter-receiver 41 into reference values in the I3C slave 13 in the parameter transformer 51, and then holds the transformed values in the parameter holder 52.

Then, the I3C master 12 issues command Sync Tick generated by the I3C command generator 21, and the I3C slave 13 starts Sync Mode. At this time, the I3C slave 13 determines that the parameter reflection determiner 53 reflects the parameter in accordance with the command Sync Tick, and reflects the parameter TU, the parameter Tph, and the parameter ODR held in the parameter holder 52.

Furthermore, the I3C master 12 issues the parameter DT decided by the parameter decider 31. After the parameter transformer 51 of the I3C slave 13 transforms the parameter DT received by the data transmitter-receiver 41 into the reference value in the I3C slave 13, the parameter corrector 54 corrects a Tph start time by using a setting value of the parameter DT.

Thereafter, in a case where the parameter is changed, the I3C master 12 transmits the changed parameter TU, parameter Tph, and parameter ODR decided by the parameter decider 31 to the I3C slave 13 via the data transmitter-receiver 22 at an arbitrary timing in which the bus is free. Note that the I3C master 12 is only required to transmit only a changed parameter of the parameter TU, the parameter Tph, and the parameter ODR. The I3C slave 13 transforms (converts) the changed parameter TU, parameter Tph, and parameter ODR received by the data transmitter-receiver 41 into reference values in the I3C slave 13 in the parameter transformer 51, and then holds the transformed values in the parameter holder 52.

Subsequently, the I3C master 12 issues the command Sync Tick generated by the I3C command generator 21 and the parameter DT decided by the parameter decider 31. Accordingly, the I3C slave 13 determines that the parameter reflection determiner 53 reflects the parameter, and reflects the changed parameter TU, parameter Tph, and parameter ODR held in the parameter holder 52.

As described above, with the command Sync Tick as a sign, the parameter having been changed can be dynamically set at a timing at which the parameter is to be reflected in the middle of Sync Mode.

<Parameter Change Processing>

Figure 8:
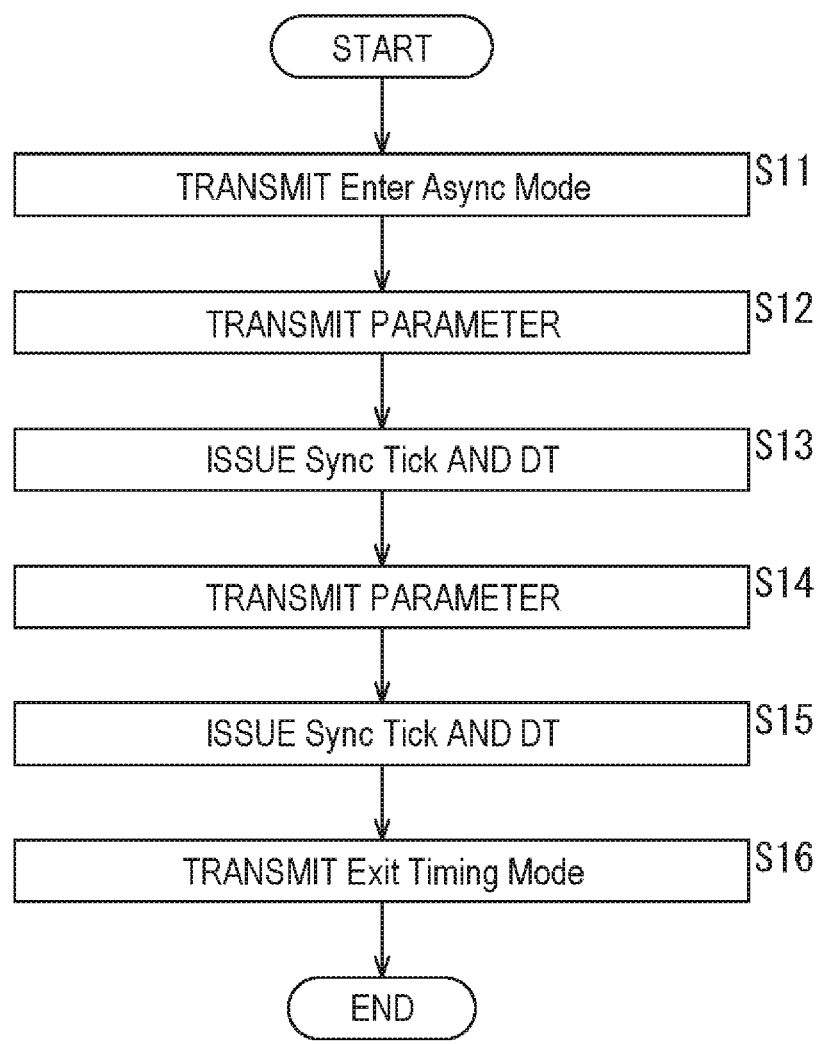
FIG. 8 is a flowchart for describing parameter change processing on a side of the I3C master.

FIG. 8 is a flowchart for describing parameter change processing performed in the I3C master 12.

When the I3C master 12 uses both Async Mode and Sync Mode when starting communication in a synchronous mode with the I3C slave 13, the I3C command generator 21 generates command Enter Async Mode and supplies the command Enter Async Mode to the data transmitter-receiver 22 in step S11. Then, the data transmitter-receiver 22 transmits the command Enter Async Mode to the I3C slave 13. Note that the command Enter Async Mode may be transmitted after Sync Mode is started.

In step S12, the parameter decider 31 decides the parameter TU, the parameter Tph, and the parameter ODR, and supplies the parameters to the data transmitter-receiver 22. Then, the data transmitter-receiver 22 transmits the parameter TU, the parameter Tph, and the parameter ODR to the I3C slave 13.

In step S13, the I3C command generator 21 generates the command Sync Tick and supplies the command Sync Tick to the data transmitter-receiver 22, and the parameter decider 31 decides the parameter DT and supplies the parameter DT to the data transmitter-receiver 22. Then, the data transmitter-receiver 22 issues the command Sync Tick and the parameter DT.

Thereafter, at a timing when the parameter needs to be changed, in step S14, the parameter decider 31 decides the parameter TU, parameter Tph, and parameter ODR having been changed, and supplies the parameters to the data transmitter-receiver 22. Then, the data transmitter-receiver 22 transmits the parameter TU, parameter Tph, and parameter ODR having been changed to the I3C slave 13.

In step S15, the I3C command generator 21 generates the command Sync Tick and supplies the command Sync Tick to the data transmitter-receiver 22, and the parameter decider 31 decides the parameter DT and supplies the parameter DT to the data transmitter-receiver 22. Then, the data transmitter-receiver 22 issues the command Sync Tick and the parameter DT.

When the communication is further continued and the I3C master 12 ends the communication in a synchronous mode with the I3C slave 13, the I3C command generator 21 generates command Exit Timing Mode and supplies the command Exit Timing Mode to the data transmitter-receiver 22 in step S16. Then, after the data transmitter-receiver 22 transmits the command Exit Timing Mode to the I3C slave 13, the processing ends.

Figure 9:
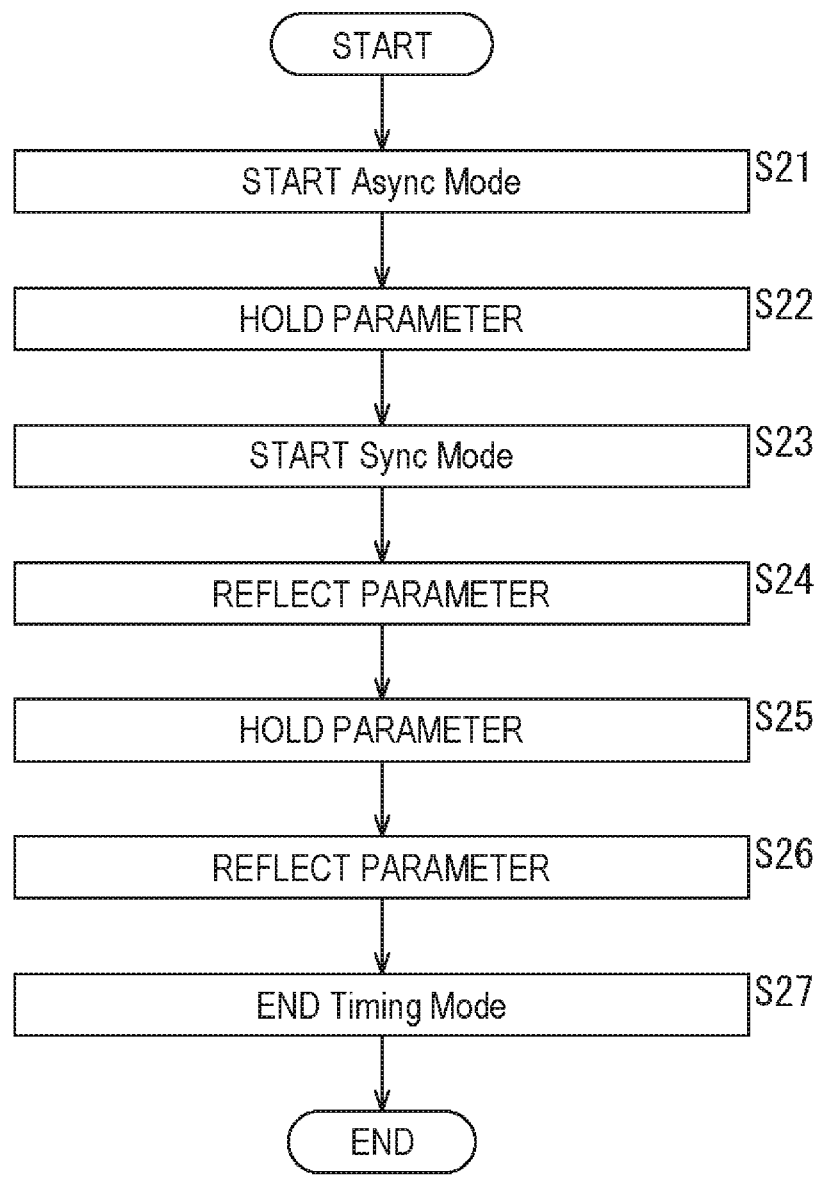
FIG. 9 is a flowchart for describing parameter change processing on a side of the I3C slave.

FIG. 9 is a flowchart for describing parameter change processing performed in the I3C slave 13.

In step S21, the data transmitter-receiver 41 receives the command Enter Async Mode transmitted from the I3C master 12 in step S11 in FIG. 8, and supplies the command Enter Async Mode to the time synchronization control unit 43. Then, the time synchronization control unit 43 starts Async Mode by performing control according to the command Enter Async Mode.

In step S22, the data transmitter-receiver 41 receives the parameter TU, the parameter Tph, and the parameter ODR transmitted from the I3C master 12 in step S12 in FIG. 8, and supplies the parameters to the I3C command interpreter 42. Then, the I3C command interpreter 42 holds the parameter TU, the parameter Tph, and the parameter ODR in the parameter holder 52.

In step S23, the data transmitter-receiver 41 receives the command Sync Tick and the parameter DT issued from the I3C master 12 in step S13 in FIG. 8, and supplies the command Sync Tick and the parameter DT to the time synchronization control unit 43. Then, the parameter corrector 54 corrects the Tph start time by using the setting value of the parameter DT, and the time synchronization control unit 43 starts Sync Mode by performing control according to the command Sync Tick.

In step S24, the parameter reflection determiner 53 determines to reflect the parameter in accordance with the command Sync Tick, and reflects the parameter TU, the parameter Tph, and the parameter ODR held in the parameter holder 52.

In step S25, the data transmitter-receiver 41 receives the changed parameter TU, parameter Tph, and parameter ODR transmitted from the I3C master 12 in step S14 in FIG. 8, and supplies the parameters to the I3C command interpreter 42. Then, the I3C command interpreter 42 holds the parameter TU, parameter Tph, and parameter ODR having been changed in the parameter holder 52.

In step S26, the data transmitter-receiver 41 receives the command Sync Tick and the parameter DT issued from the I3C master 12 in step S15 in FIG. 8, and supplies the command Sync Tick and the parameter DT to the I3C command interpreter 42. Then, the parameter reflection determiner 53 determines to reflect the parameter in accordance with the command Sync Tick, and reflects the changed parameter TU, parameter Tph, and parameter ODR held in the parameter holder 52.

The communication is further continued, and in step S27, the data transmitter-receiver 41 receives the command Exit Timing Mode transmitted from the I3C master 12 in step S16 in FIG. 8, and supplies the command Exit Timing Mode to the time synchronization control unit 43. Then, the time synchronization control unit 43 ends Async Mode and Sync Mode by performing control according to the command Exit Timing Mode.

<Application Examples of Method of Changing Parameter>

Application examples of the method of changing a parameter will be described with reference to FIGS. 10 to 13.

Figure 10:
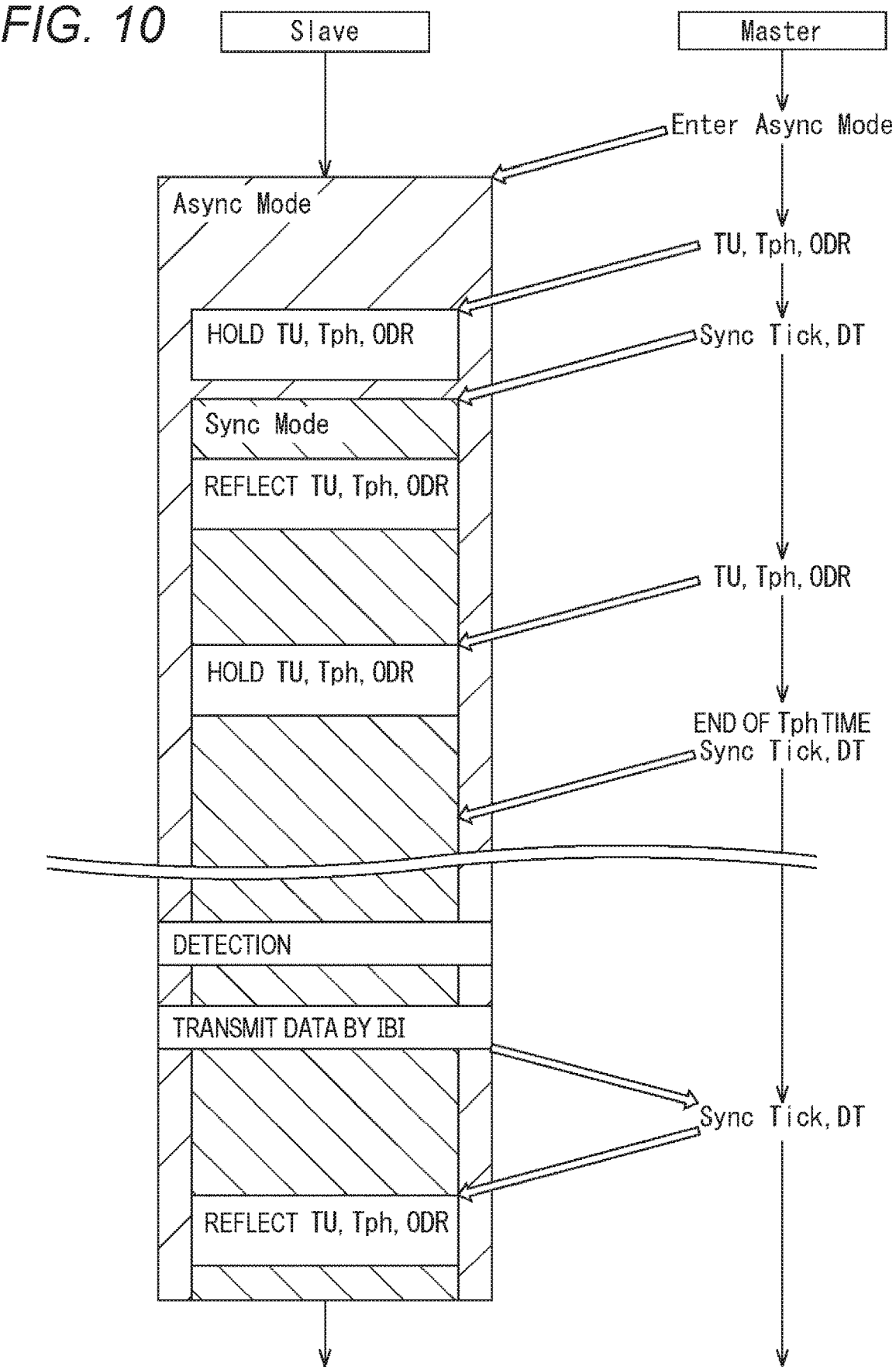
FIG. 10 is a diagram for describing a first application example of a change method of dynamically changing a parameter in the middle of Sync Mode.

FIG. 10 is a diagram for describing a first application example of a change method of dynamically changing a parameter in the middle of Sync Mode.

For example, the processing from transmission of the command Enter Async Mode to holding of the parameter TU, parameter Tph, and parameter ODR having been changed is similar to the processing described with reference to FIG. 7.

Thereafter, the I3C master 12 determines to issue the command Sync Tick and the parameter DT by the parameter transmission determiner 32 for an end of the Tph time. In accordance with this determination, the I3C master 12 issues the command Sync Tick generated by the I3C command generator 21 and the parameter DT decided by the parameter decider 31. In the I3C slave 13, the data transmitter-receiver 41 receives the command Sync Tick and the parameter DT, and the parameter reflection determiner 53 determines not to reflect the parameter having been changed because of the command Sync Tick for synchronization correction at the end of the Tph time.

Then, in the I3C slave 13, the detector 45 detects any target object from the image captured by the imaging unit 44, and then, the data transmitter-receiver 41 transmits data by IBI in Async Mode via the data processor 46. In the I3C master 12, the data processor 23 processes data received by the data transmitter-receiver 22, and in response to the reception of the data, the parameter transmission determiner 32 determines to issue the command Sync Tick and the parameter DT. In accordance with this determination, the I3C master 12 issues the command Sync Tick generated by the I3C command generator 21 and the parameter DT decided by the parameter decider 31.

Accordingly, the I3C slave 13 determines that the parameter reflection determiner 53 reflects the parameter, and reflects the changed parameter TU, parameter Tph, and parameter ODR held in the parameter holder 52.

As described above, in the I3C bus 11, in the command Sync Tick at the end of the Tph time, the parameter having been changed can be set at the timing at which the parameter is to be reflected, with the command Sync Tick at a timing other than the end of the Tph time as a sign, without reflecting the parameters.

Figure 11:
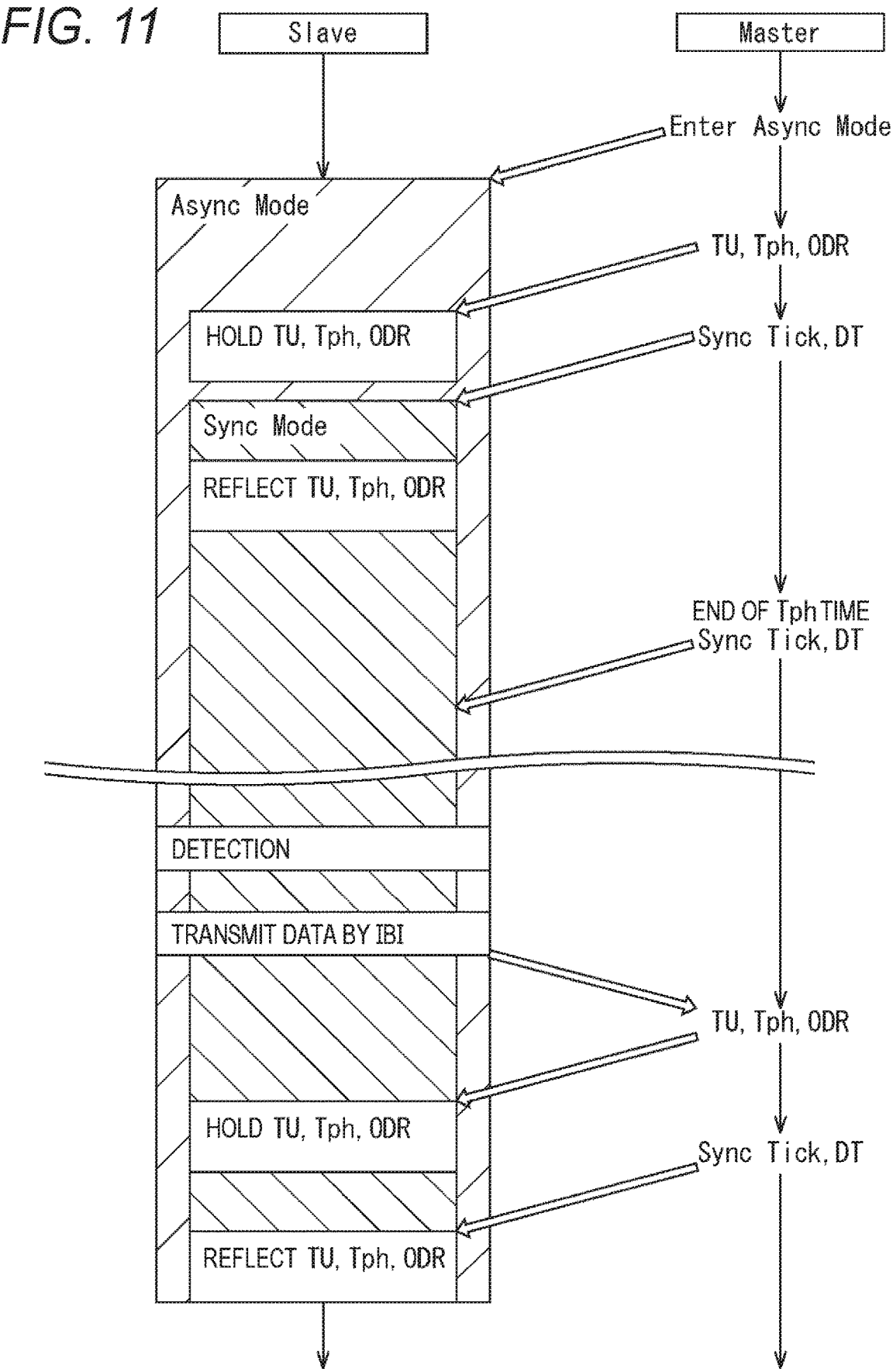
FIG. 11 is a diagram for describing a second application example of the change method of dynamically changing a parameter in the middle of Sync Mode.

FIG. 11 is a diagram for describing a second application example of the change method of dynamically changing a parameter in the middle of Sync Mode.

For example, the processing from transmission of the command Enter Async Mode to reflecting of the parameter TU, the parameter Tph, and the parameter ODR is similar to the processing described with reference to FIG. 7.

Thereafter, the I3C master 12 determines to issue the command Sync Tick and the parameter DT by the parameter transmission determiner 32 for an end of the Tph time. In accordance with this determination, the I3C master 12 issues the command Sync Tick generated by the I3C command generator 21 and the parameter DT decided by the parameter decider 31. In the I3C slave 13, the data transmitter-receiver 41 receives the command Sync Tick and the parameter DT, and the parameter reflection determiner 53 determines not to reflect the parameter having been changed because of the command Sync Tick for synchronization correction at the end of the Tph time.

Then, in the I3C slave 13, the detector 45 detects any target object from the image captured by the imaging unit 44, and then, the data transmitter-receiver 41 transmits data by IBI in Async Mode via the data processor 46. In the I3C master 12, the data processor 23 processes data received by the data transmitter-receiver 22, and in response to the reception of the data, the parameter transmission determiner 32 transmits the parameter TU, parameter Tph, and parameter ODR, and determines having been changed to issue the command Sync Tick and the parameter DT.

In accordance with this determination, the I3C master 12 transmits the changed parameter TU, parameter Tph, and parameter ODR decided by the parameter decider 31 to the I3C slave 13 via the data transmitter-receiver 22. The I3C slave 13 transforms (converts) the changed parameter TU, parameter Tph, and parameter ODR received by the data transmitter-receiver 41 into reference values in the I3C slave 13 in the parameter transformer 51, and then holds the transformed values in the parameter holder 52.

Subsequently, the I3C master 12 issues the command Sync Tick generated by the I3C command generator 21 and the parameter DT decided by the parameter decider 31. Accordingly, the I3C slave 13 determines that the parameter reflection determiner 53 reflects the parameter, and reflects the changed parameter TU, parameter Tph, and parameter ODR held in the parameter holder 52.

As described above, in the I3C bus 11, in the command Sync Tick at the end of the Tph time, the parameter having been changed can be set at the timing at which the parameter is to be reflected, with the command Sync Tick at a timing other than the end of the Tph time as a sign, without reflecting the parameters.

A change method of dynamically changing a parameter for a plurality of I3C slaves 13 in the middle of Sync Mode will be described with reference to FIGS. 12 and 13.

Figure 12:
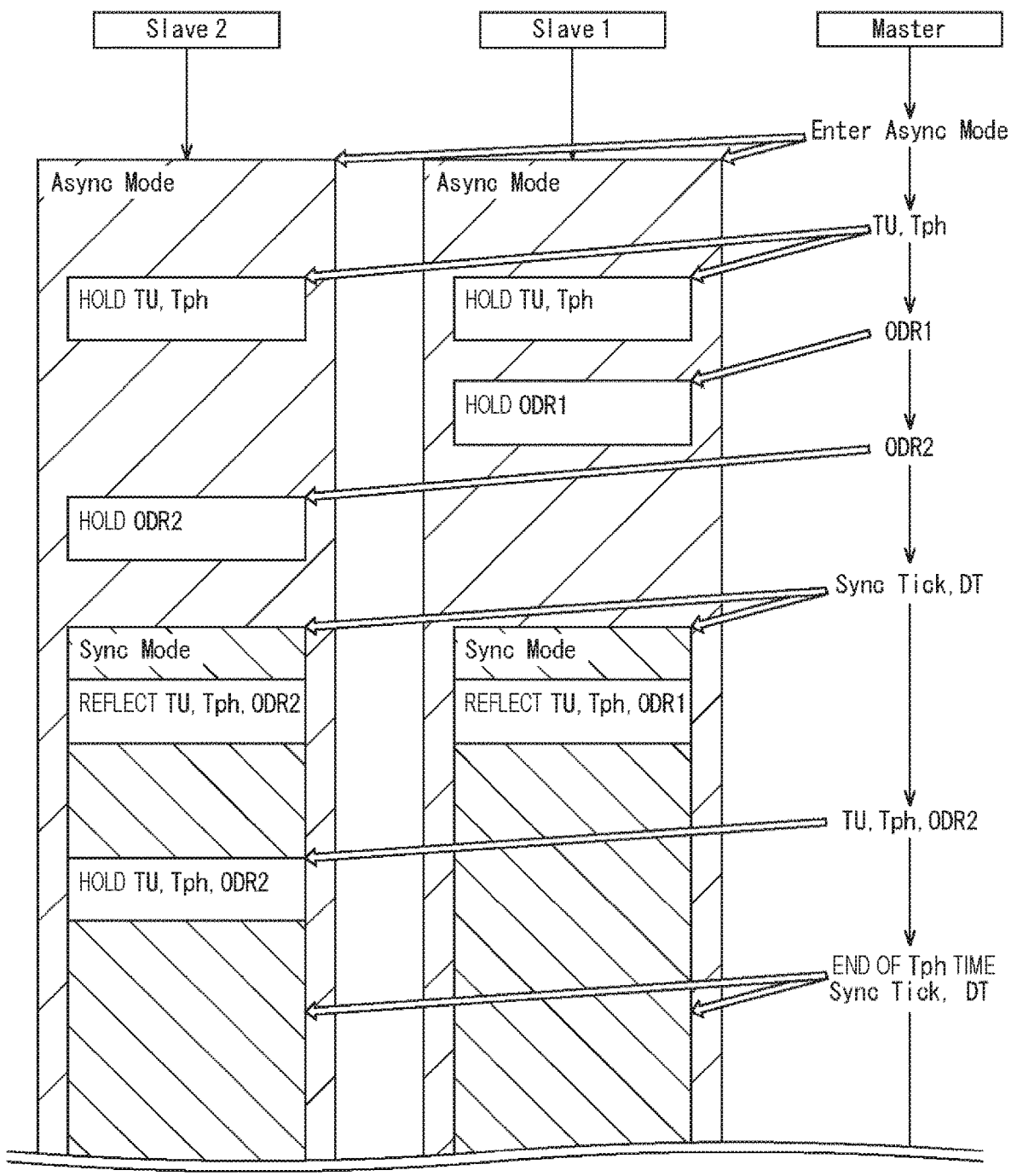
FIG. 12 is a diagram for describing a change method of dynamically changing a parameter for a plurality of I3C slaves in the middle of Sync Mode.
Figure 13:
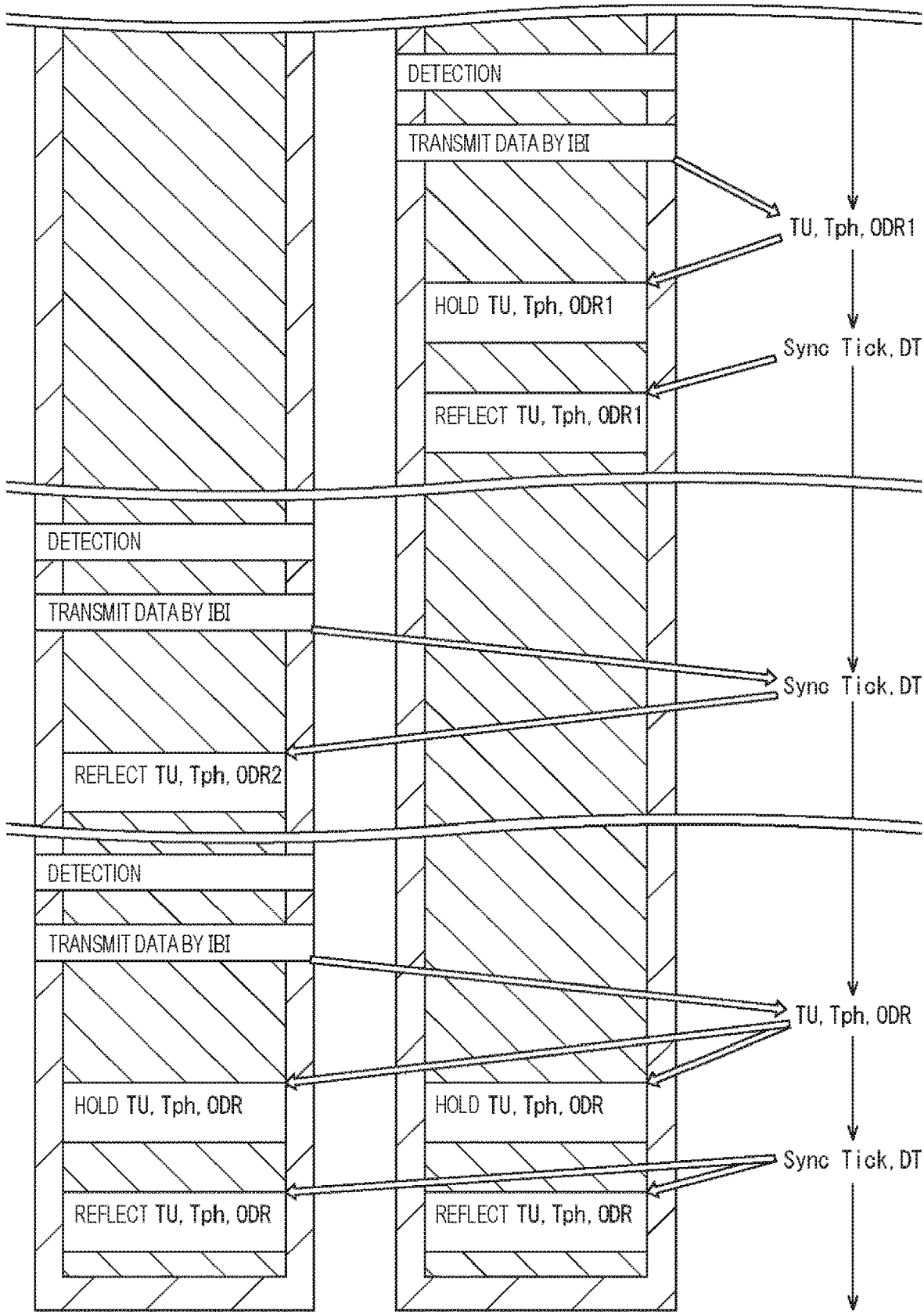
FIG. 13 is a diagram for describing a change method of dynamically changing a parameter for the plurality of I3C slaves in the middle of Sync Mode.

FIGS. 12 and 13 illustrate examples in which the I3C master 12 changes parameters for the two I3C slaves 13-1 and 13-2.

First, the I3C master 12 transmits the command Enter Async Mode generated by the I3C command generator 21 to the I3C slaves 13-1 and 13-2. The I3C slaves 13-1 and 13-2 start Async Mode in accordance with the command Enter Async Mode.

Next, the I3C master 12 transmits the parameter TU and the parameter Tph to the I3C slaves 13-1 and 13-2. The I3C slaves 13-1 and 13-2 transform (convert) the parameter TU and the parameter Tph into respective reference values in the I3C slaves 13-1 and 13-2, and hold the reference values.

Subsequently, the I3C master 12 transmits a parameter ODR1 to the I3C slave 13-1 and transmits a parameter ODR2 to the I3C slave 13-2. The I3C slave 13-1 transforms (converts) the parameter ODR1 into a reference value in the I3C slave 13-1 and holds the transformed value, and the I3C slave 13-2 transforms (converts) the parameter ODR2 into a reference value in the I3C slave 13-2 and holds the reference value.

Next, the I3C master 12 issues the command Sync Tick and the parameter DT, and then, the I3C slaves 13-1 and 13-2 start Sync Mode. At this time, the I3C slave 13-1 reflects the parameter TU, the parameter Tph, and the parameter ODR1, and the I3C slave 13-2 reflects the parameter TU, the parameter Tph, and the parameter ODR2.

Thereafter, for example, the I3C master 12 can set in advance the parameter TU, parameter Tph, and parameter ODR2 having been changed and cause the I3C slave 13-2 to hold the parameter TU, parameter Tph, and parameter ODR2 having been changed. Then, when data is transmitted from the I3C slave 13-2 by IBI, the I3C master 12 issues the command Sync Tick and the parameter DT, and can reflect the changed parameter TU, parameter Tph, and parameter ODR2 set in advance.

Furthermore, for example, when data is transmitted from the I3C slave 13-1 by IBI, the I3C master 12 can transmit the parameter TU, parameter Tph, and parameter ODR1 having been changed at an arbitrary timing, and issue and reflect the command Sync Tick and the parameter DT.

Furthermore, for example, the data transmitted by the I3C slave 13-2 by IBI can include information indicating which I3C slave 13 is to set which parameter. For example, the I3C slave 13-2 transmits, by IBI, data including information indicating that a parameter common to the I3C slaves 13-1 and 13-2 are to be set, and then, the I3C master 12 transmits the common parameter TU, parameter Tph, and parameter ODR having been changed to the I3C slaves 13-1 and 13-2. In response to this transmission, the I3C slaves 13-1 and 13-2 respectively transform (convert) the common parameter TU, parameter Tph, and parameter ODR having been changed into respective reference values in the I3C slaves 13-1 and 13-2 and hold the reference values. Thereafter, the I3C master 12 issues the command Sync Tick and the parameter DT, and then, the I3C slaves 13-1 and 13-2 respectively reflect the common parameter TU, parameter Tph, and parameter ODR having been changed.

Here, in the above-described embodiment, the processing with use of Async Mode has been described. However, it is not essential to use Async Mode together, and the present technology can be applied to Sync Mode without use of Async Mode.

Figure 14:
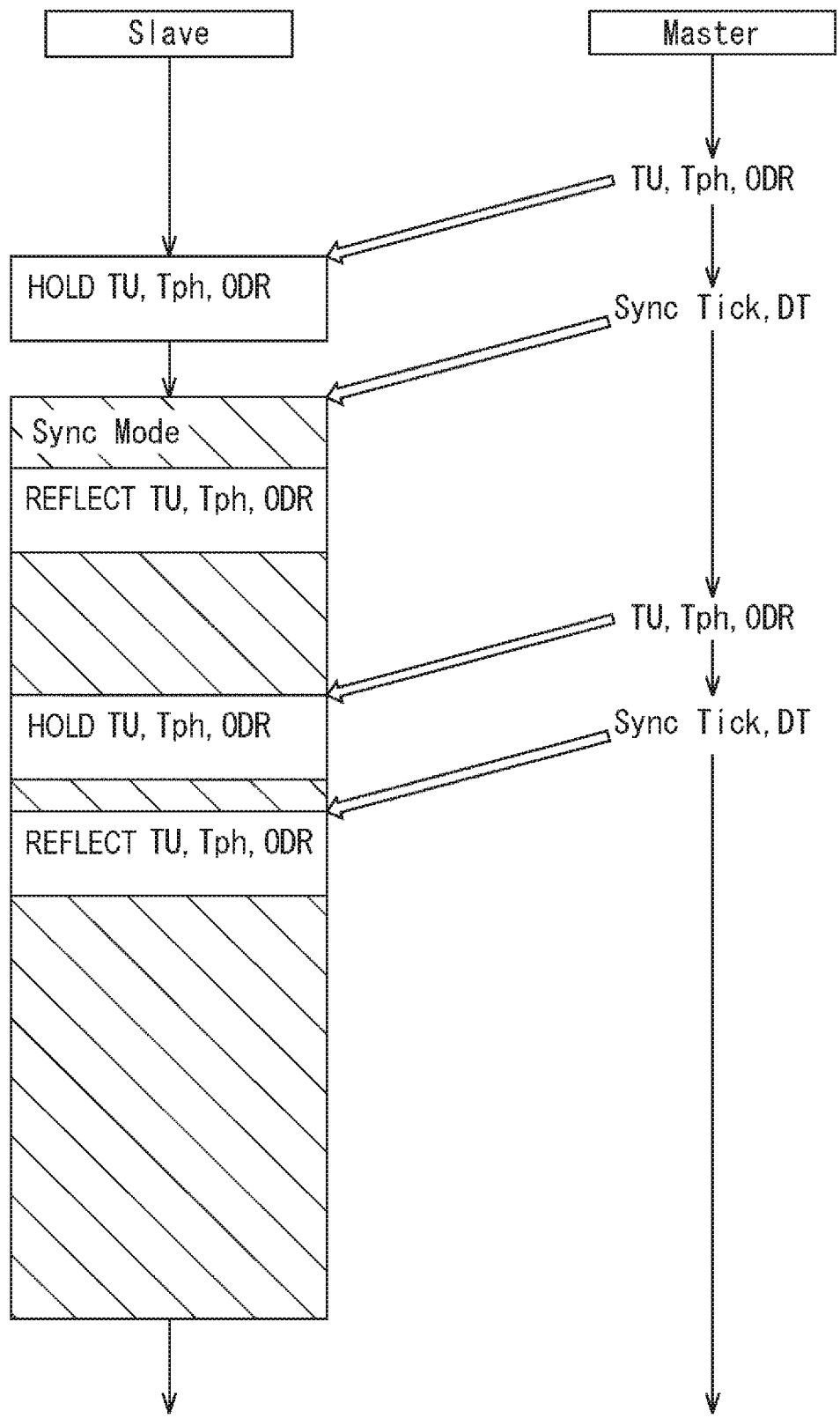
FIG. 14 is a diagram for describing a method of dynamically changing the setting parameter in the middle of Sync Mode without use of Async Mode.

For example, FIG. 14 illustrates an example of a method of dynamically changing a setting parameter in the middle of Sync Mode by applying the present technology without use of Async Mode.

For example, the I3C master 12 transmits the parameter TU, the parameter Tph, the parameter ODR, and then, the I3C slave 13 holds the setting values according to these parameters. Thereafter, the I3C master 12 issues the command Sync Tick giving an instruction to start synchronization in Sync Mode and the parameter DT, and then, the I3C slave 13 starts Sync Mode and reflects the parameter TU, the parameter Tph, and the parameter ODR.

Then, in a case where the parameter is changed, the I3C master 12 transmits the parameter TU, parameter Tph, and parameter ODR having been changed to the I3C slave 13. Note that the I3C master 12 is only required to transmit only a changed parameter of the parameter TU, the parameter Tph, and the parameter ODR. In response to this transmission, the I3C slave 13 holds the parameter TU, parameter Tph, and parameter ODR having been changed. Thereafter, the I3C master 12 issues the command Sync Tick and the parameter DT, and then, the I3C slave 13 reflects the parameter TU, the parameter Tph, and the parameter ODR.

Furthermore, in the method described above with reference to FIGS. 10 and 11, the I3C slave 13 does not reflect the parameter having been changed when receiving the command Sync Tick for synchronization correction at the end of the Tph time, but such a method is not necessary.

Figure 15:
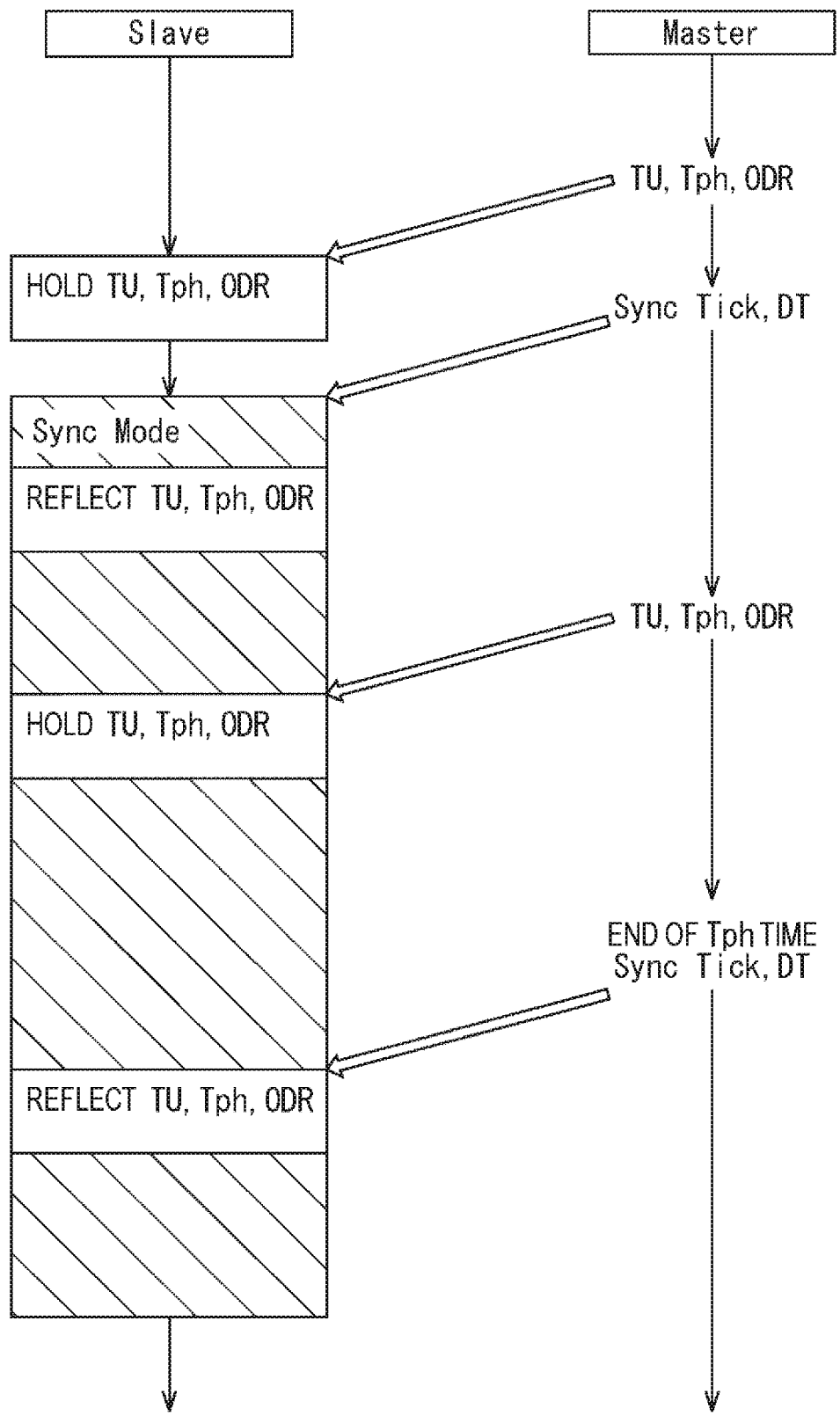
FIG. 15 is a diagram illustrating an example of reflecting a parameter having been changed in Sync Tick at an end of Tph time.

That is, as illustrated in FIG. 15, the I3C slave 13 may reflect the parameter having been changed in the command Sync Tick for synchronization correction at the end of the Tph time.

<Definition of Time Unit>

Next, a definition of the time unit will be described with reference to FIGS. 16 to 24.

Figure 16:
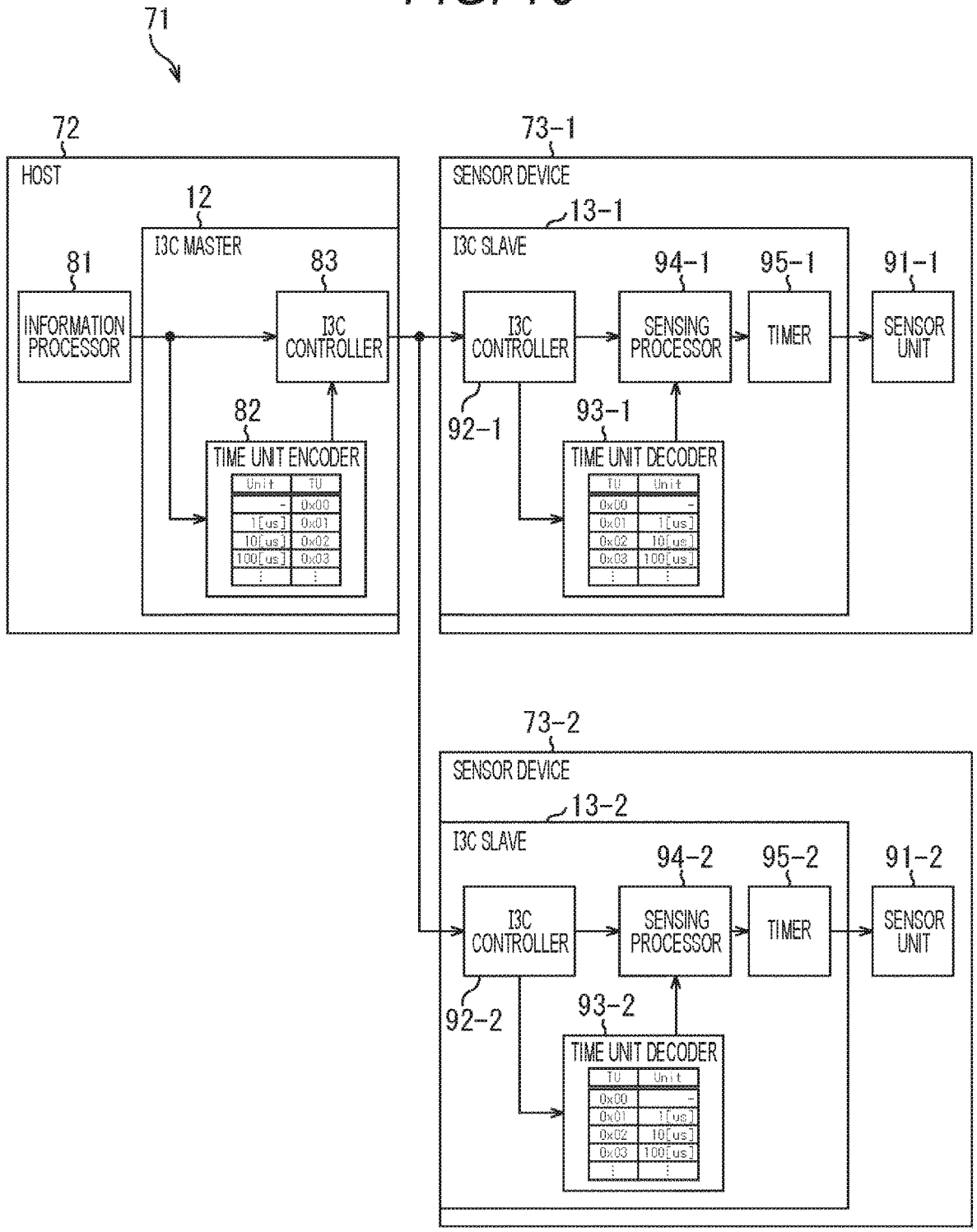
FIG. 16 is a block diagram illustrating a configuration example of a system using the I3C bus.

The I3C bus 11 illustrated in FIG. 1 described above is adopted, for example, for communication of a system including a plurality of sensor devices as illustrated in FIG. 16.

A system 71 illustrated in FIG. 16 is configured by connecting a sensor device 73-1 including the I3C slave 13-1 and a sensor device 73-2 including the I3C slave 13-2 to a host 72 including the I3C master 12.

The host 72 includes an information processor 81 including, for example, firmware or an application in addition to the I3C master 12, and the I3C master 12 includes a time unit encoder 82 and an I3C controller 83.

The sensor device 73-1 includes a sensor unit 91-1 such as a temperature sensor, for example, in addition to the I3C slave 13-1, and the I3C slave 13-1 includes an I3C controller 92-1, a time unit decoder 93-1, a sensing processor 94-1, and a timer 95-1. Similarly, the sensor device 73-2 includes a sensor unit 91-2 such as an image sensor, for example, in addition to the I3C slave 13-2, and the I3C slave 13-2 includes an I3C controller 92-2, a time unit decoder 93-2, a sensing processor 94-2, and a timer 95-2.

Then, in the system 71, a time unit necessary for obtaining sensing interval information, time difference correction information, and the like is defined/standardized in order to cause the plurality of sensor devices 73 to perform sensing in synchronization. For example, the time unit can be a time unit table that defines a transformation rule that associates the parameter TU and unit time Unit with each other.

That is, a time unit encode table for obtaining the parameter TU from the unit time Unit is set in advance in the time unit encoder 82 included in the I3C master 12 of the host 72. In addition, a time unit decode table for obtaining the unit time Unit from the parameter TU is set in advance in a time unit decoder 93 included in the I3C slave 13 of the sensor device 73.

For example, in the host 72, when the sensing interval information is supplied from the information processor 81 to the I3C master 12, the time unit encoder 82 obtains the parameter TU from the unit time Unit indicated by the sensing interval information. Then, the parameter TU is transmitted via the I3C controller 83 to the sensor devices 73-1 and 73-2.

In the sensor device 73-1, the parameter TU is supplied to the time unit decoder 93-1 via the I3C slave 13-1, and the time unit decoder 93-1 obtains the unit time Unit from the parameter TU and supplies the unit time Unit to the sensing processor 94-1. The sensing processor 94-1 performs processing necessary for sensing in the sensor device 73-1, and sets the unit time Unit in the timer 95-1. Therefore, the timer 95-1 can transform a delay time into an appropriate parameter on the basis of, for example, the unit time Unit. As a result, the timer 95-1 can supply a sensing trigger to the sensor unit 91-1 at a timing decided by an appropriate parameter to perform sensing. Furthermore, in the sensor device 73-2, processing similar to the processing of the sensor device 73-1 is performed.

At this time, in the system 71, by using the standardized time unit encode table and time unit decode table, time can be calculated on a consistent scale even in a plurality of different vendors, a plurality of different devices, and the like, for example. In this way, by complying with the standard, it is possible to avoid the need for an advance agreement between devices, and as a result, for example, it is possible to suppress a business cost.

In addition, in many sensor devices 73, the time unit decoder 93 can be implemented in hardware, and deployment to different systems/sets is facilitated. Furthermore, since the host 72 can collectively distribute a command of a parameter set in Sync Mode to each sensor device 73 by broadcasting, for example, a load can be reduced. Then, the host 72 can collectively set parameters for all the sensor devices 73 by transmitting only one broadcast command at minimum without transmitting a command depending on the number of the sensor devices 73.

Figure 17:
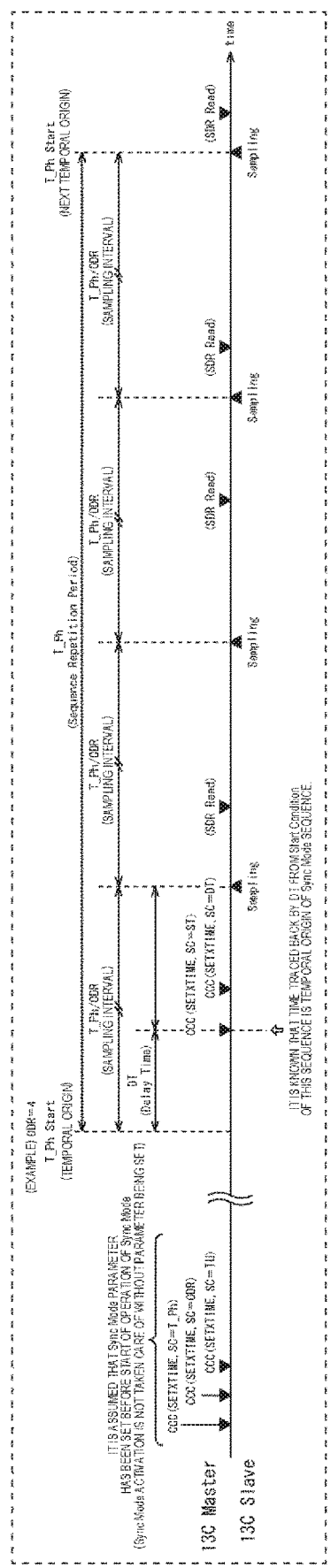
FIG. 17 is a diagram illustrating various timings in a Sync Mode operation.

FIG. 17 illustrates various timings in Sync Mode operation of the system 71.

For example, the delay time illustrated in FIG. 17 is a period from the timing when the information processor 81 of the host 72 gives an instruction on "start" to when a physical layer of the I3C master 12 issues Start Condition, and can be designated by using the parameter TU. As described below, FIGS. 18 to 23 are examples of a time unit table that defines the parameter TU for delay time.

FIG. 18 illustrates an example of a time unit table defined such that a table in which a wide range of time can be set and a table securing a certain degree of granularity are combined and selection can be made in accordance with a character of the system.

For example, in the time unit table in FIG. 18, in a case where the seventh bit of the parameter TU is 1'b0, the unit time Unit is defined as $10^{(TU-1)}$ [ns], and in a case where the seventh bit of the parameter TU is 1'b1, the unit time Unit is defined as most significant Inc [ns]. For example, in this time unit table, in a case where the parameter TU is set to 8'h03 and the parameter DT is 8'h92, the delay time can be obtained as 9.2 [μs] (=8'h92×100 ns).

FIGS. 19 and 20 illustrate a time unit table that defines the delay time by the parameter TU so that a narrow range of time can be set (the delay time can be set precisely).

For example, in the time unit table in FIG. 19, the unit time Unit is defined as TU [ns]. Alternatively, the unit time Unit may be defined as TU [μs].

Furthermore, in the time unit table in FIG. 20, the unit time Unit is defined as 2×TU [ns]. Alternatively, the unit time Unit may be defined as 2×TU [μs].

FIGS. 21 and 22 illustrate a time unit table that defines the delay time by the parameter TU so that a broad range of time can be set (the delay time can be set roughly).

For example, in the time unit table in FIG. 21, the unit time Unit is defined as $2^{(TU-1)}$ [ns]. Therefore, in this time unit table, max.1 [s] can be expressed by 0×18.

Furthermore, in the time unit table in FIG. 22, the unit time Unit is defined as $10^{(TU-1)}$ [ns]. Therefore, in this time unit table, max.1 [s] can be expressed by 0×08.

FIG. 23 illustrates a time unit table that defines the unit time Unit as most significant Inc [ns].

In addition, a sequence repetition period illustrated in FIG. 17 is a period in which a sequence is repeated in the Sync Mode operation, and can be designated by using the parameter Tph.

FIG. 24 illustrates an example of a time unit table that defines the parameter Tph in the Sync Mode operation.

In the time unit table in FIG. 24, the parameter Tph is 8'h01 and is defined as 5 [ns] shorter than which cannot be set theoretically, and the parameter Tph is 8'h33 and is defined as 1 [s] referred to as "general" in a standard specification.

By defining the time unit by the time unit table as described above, the system 71 can unify the change of the parameter TU and the parameter Tph, and enables connection between various sensor devices 73. As a result, the system 71 can reduce the number of times of transmitting the parameter TU and the parameter Tph, for example.

<Configuration Example of Computer>

Next, the above-described series of processing (communication method) can be performed by hardware or software. In a case where the series of processing is performed by software, a program constituting the software is installed in a general-purpose computer or the like.

Figure 25:
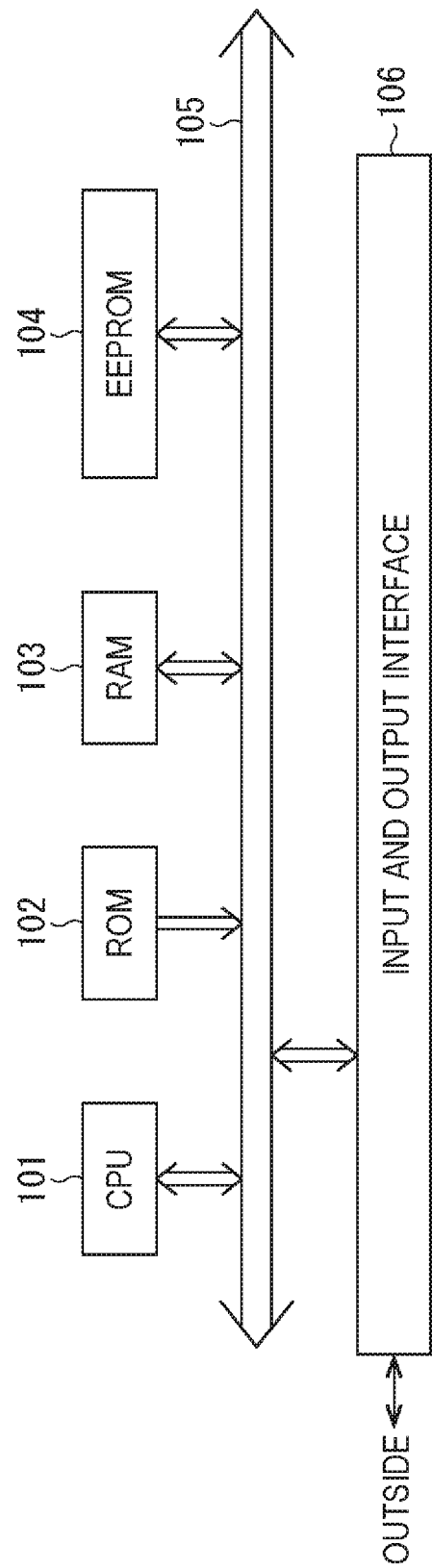
FIG. 25 is a block diagram illustrating a configuration example of one embodiment of a computer to which the present technology is applied.

FIG. 25 is a block diagram illustrating a configuration example of one embodiment of a computer in which a program for executing the above-described series of processing is installed.

The program can be recorded in advance in a hard disk 105 or a ROM 103 as a recording medium built in the computer.

Alternatively, the program can be stored (recorded) in a removable recording medium 111 driven by a drive 109. Such a removable recording medium 111 can be provided as so-called package software. Here, examples of the removable recording medium 111 include, for example, a flexible disk, a compact disc read only memory (CD-ROM), a magneto optical (MO) disk, a digital versatile disc (DVD), a magnetic disk, a semiconductor memory, and the like.

Note that the program can be installed in the computer from the removable recording medium 111 as described above, or can be downloaded to the computer via a communication network or a broadcast network and installed in the built-in hard disk 105. That is, for example, the program can be wirelessly transferred from a download site to the computer via an artificial satellite for digital satellite broadcasting, or can be transferred by wire to the computer via a network such as a local area network (LAN) or the Internet.

The computer incorporates a central processing unit (CPU) 102, and an input and output interface 110 is connected to the CPU 102 via a bus 101.

A command is input by a user operating an input unit 107 or the like via the input and output interface 110, and then, the CPU 102 executes a program stored in the read only memory (ROM) 103 in accordance with the command. Alternatively, the CPU 102 loads the program stored in the hard disk 105 into a random access memory (RAM) 104 and executes the program.

Therefore, the CPU 102 performs the processing according to the above-described flowchart or the processing performed by the configuration of the above-described block diagram. Then, the CPU 102 outputs a result of the processing from an output unit 106 via the input and output interface 110, for example, or transmits the result from a communication unit 108, and records the result in the hard disk 105 or the like, as necessary.

Note that the input unit 107 includes a keyboard, a mouse, a microphone, and the like. In addition, the output unit 106 includes a liquid crystal display (LCD), a speaker, and the like.

Here, in the present specification, the processing performed by the computer in accordance with the program is not necessarily performed in time series in the order described as the flowchart. That is, the processing performed by the computer in accordance with the program also includes processing executed in parallel or individually (for example, parallel processing or processing by an object).

In addition, the program may be processed by one computer (processor) or may be processed in a distributed manner by a plurality of computers. Furthermore, the program may be transferred to a remote computer and executed.

Moreover, in the present specification, a system means a set of a plurality of components (devices, modules (parts), and the like), and it does not matter whether or not all the components are in the same housing. Therefore, a plurality of devices accommodated in separate housings and connected via a network and one device in which a plurality of modules is accommodated in one housing are both systems.

In addition, for example, a configuration described as one device (or processor) may be divided and configured as a plurality of devices (or processors). Conversely, the configurations described above as a plurality of devices (or processors) may be collectively configured as one device (or processor). Furthermore, a configuration other than the above-described configuration may be added to the configuration of each device (or each processor). Moreover, as long as the configuration and operation of the system as a whole are substantially the same, a part of the configuration of one device (or processor) may be included in the configuration of another device (or another processor).

Furthermore, for example, the present technology can have a configuration of cloud computing in which one function is shared and processed in cooperation by a plurality of devices via a network.

In addition, for example, the above-described program can be executed in an arbitrary device. In that case, the device is only required to have a necessary function (functional block or the like) and obtain necessary information.

Furthermore, for example, each step described in the above-described flowchart can be executed by one device or can be shared and executed by a plurality of devices. Moreover, in a case where a plurality of processing is included in one step, the plurality of processing included in the one step can be executed by one device or can be shared and executed by a plurality of devices. In other words, a plurality of processing included in one step can also be executed as processing of a plurality of steps. Conversely, the processing described as a plurality of steps can be collectively executed as one step.

Note that, in the program executed by the computer, processing of steps writing the program may be executed in time series in the order described in the present specification, or may be executed in parallel or individually at a necessary timing such as when a call is made or the like. That is, as long as there is no contradiction, the processing of each step may be executed in an order different from the above-described order. Furthermore, the processing of steps writing this program may be executed in parallel with the processing of another program, or may be executed in combination with the processing of another program.

Note that a plurality of the present technologies described in the present specification can be implemented independently as a single body as long as there is no contradiction. As a matter of course, a plurality of arbitrary present technologies can be implemented in combination. For example, some or all of the present technology described in any of the embodiments can be implemented in combination with some or all of the present technology described in other embodiments. Furthermore, some or all of the arbitrary present technologies can be implemented in combination with other technologies not described above.

<Example of Combination of Configurations>

Note that the present technology can adopt the following configurations.

(1) A communication apparatus includes a parameter transmitter that transmits a parameter having been changed to a communication apparatus of a counterpart side during communication in a synchronous mode with the communication apparatus of the counterpart side that performs dependent communication, and a command transmitter that gives an instruction, by transmitting a predetermined command, on a timing at which the parameter having been changed is reflected in the communication apparatus of the counterpart side.

(2) In the communication apparatus according (1) described above, the parameter transmitter transmits the parameter having been changed at an arbitrary timing at which a bus that transmits and receives a signal to and from the communication apparatus of the counterpart side is free.

(3) In the communication apparatus according to (1) or (2) described above, the command transmitter transmits the predetermined command subsequently to transmission of the parameter having been changed.

(4) In the communication apparatus according to any of (1) to (3) described above, the command transmitter transmits the predetermined command in response to transmission of data from the communication apparatus of the counterpart side.

(5) In the communication apparatus according to any of (1) to (4) described above, the parameter transmitter transmits the parameter having been changed in response to transmission of data from the communication apparatus of the counterpart side, and the command transmitter transmits the predetermined command subsequently to transmission of the parameter having been changed.

(6) The communication apparatus according to any of (1) to (5) described above further includes a time unit encoder that defines a transformation rule necessary for obtaining the parameter from a predetermined unit time used in communication and obtains the parameter.

(7) In the communication apparatus according to (6) described above, a delay time is obtained from the parameter in the communication apparatus of the counterpart side.

(8) In the communication apparatus according to (6) or (7) described above, a sequence repetition period is obtained from the parameter in the communication apparatus of the counterpart side.

(9) A communication method includes transmitting, by a communication apparatus, a parameter having been changed to a communication apparatus of a counterpart side during communication in Sync Mode with the communication apparatus of the counterpart side, and giving an instruction, by the communication apparatus, on a timing at which the parameter having been changed is reflected in the communication apparatus of the counterpart side by transmitting a predetermined command.

(10) A program causes a computer of a communication apparatus that performs communication to execute processing including transmitting a parameter having been changed to a communication apparatus of a counterpart side during communication in a synchronous mode with the communication apparatus of the counterpart side, and giving an instruction, by transmitting a predetermined command, on a timing at which the parameter having been changed is reflected in the communication apparatus of the counterpart side.

(11) A communication apparatus includes a parameter holder that holds a parameter having been changed, the parameter being received during communication in a synchronous mode with a communication apparatus of a counterpart side having an initiative of communication, and a parameter reflection determiner that determines to reflect the parameter having been changed at a timing at which a predetermined command is transmitted from the communication apparatus of the counterpart side.

(12) The communication apparatus according to (11) described above further includes a time unit decoder that defines a transformation rule necessary for obtaining a predetermined unit time used in communication from the parameter and obtains the predetermined unit time.

(13) In the communication apparatus according to (12) described above, the time unit decoder obtains a delay time from the parameter.

(14) In the communication apparatus according to (12) or (13) described above, the time unit decoder obtains a sequence repetition period from the parameter.

(15) A communication method includes holding, by a communication apparatus, a parameter having been changed, the parameter being received during communication in a synchronous mode with a communication apparatus of a counterpart side having an initiative of communication, and determining, by the communication apparatus, to reflect the parameter having been changed at a timing at which a predetermined command is transmitted from the communication apparatus of the counterpart side.

(16) A program causes a computer of a communication apparatus that performs communication to execute processing including holding a parameter having been changed, the parameter being received during communication in a synchronous mode with a communication apparatus of a counterpart side having an initiative of communication, and determining to reflect the parameter having been changed at a timing at which a predetermined command is transmitted from the communication apparatus of the counterpart side.

Note that the present embodiment is not limited to the above-described embodiment, and various modifications can be made without departing from the gist of the present disclosure. Furthermore, the effects herein described are merely examples and are not limited, and furthermore, other effects may be obtained.

REFERENCE SIGNS LIST

11 I3C bus
12 I3C master
13 I3C slave
14 Data signal line
15 Clock signal line
21 I3C command generator
22 Data transmitter-receiver
23 Data processor
31 Parameter decider
32 Parameter transmission determiner
41 Data transmitter-receiver
42 I3C command interpreter
43 Time synchronization control unit
44 Imaging unit
45 Detector
46 Data processor
51 Parameter transformer
52 Parameter holder
53 Parameter reflection determiner
54 Parameter corrector

The invention claimed is:

1. A first communication apparatus, comprising:
a parameter transmitter configured to transmit parameter to a second communication apparatus during communication in a synchronous mode with the second communication apparatus; and
a command transmitter configured to:
transmit a specific command; and
give, based on the specific command, an instruction at a timing at which the parameter is reflected in the second communication apparatus.

2. The first communication apparatus according to claim 1, further comprising a bus configured to transmit and receive a signal to and from the second communication apparatus, wherein the parameter transmitter is further configured to transmit the parameter at an arbitrary timing at which the bus is available.

3. The first communication apparatus according to claim 1, wherein the command transmitter is further configured to transmit the specific command subsequently to the transmission of the parameter.

4. The first communication apparatus according to claim 1, wherein the command transmitter is further configured to transmit the specific command based on transmission of data from the second communication apparatus.

5. The first communication apparatus according to claim 1, wherein
the parameter transmitter is further configured to transmit the parameter based on transmission of data from the second communication apparatus, and
the command transmitter is further configured to transmit the specific command subsequently to the transmission of the parameter.

6. The first communication apparatus according to claim 1, further comprising a time unit encoder configured to:
define a transformation rule; and
obtain the parameter from a specific unit time based on the transformation rule.

7. The first communication apparatus according to claim 6, wherein the parameter in the second communication apparatus includes a delay time.

8. The first communication apparatus according to claim 6, wherein the parameter in the second communication apparatus includes a sequence repetition period.

9. A communication method, comprising:
in a first communication apparatus:
transmitting a parameter to a second communication apparatus during communication in Sync Mode with the second communication apparatus;
transmitting a specific command; and
giving, based on the specific command, an instruction at a timing at which the parameter is reflected in the second communication apparatus.

10. A non-transitory computer-readable medium having stored thereon, computer-executable instructions which, when executed by a computer of a first communication apparatus, cause the computer to execute operations, the operations comprising:
transmitting a parameter to a second communication apparatus during communication in a synchronous mode with the second communication apparatus;
transmitting a specific command; and
giving, based on the specific command, an instruction, at a timing at which the parameter reflected in the second communication apparatus.

11. A first communication apparatus, comprising:
a parameter holder configured to:
  receive a parameter from a second communication apparatus, wherein the parameter is received during communication in a synchronous mode with the second communication apparatus; and
  hold the received parameter; and
a parameter reflection determiner configured to determine to reflect the parameter at a timing at which a specific command is transmitted from the second communication apparatus.

12. The first communication apparatus according to claim 11, further comprising a time unit decoder configured to:
define a transformation rule; and
obtain a specific unit time from the parameter based on the transformational rule.

13. The first communication apparatus according to claim 12, wherein the time unit decoder is further configured to obtain a delay time from the parameter.

14. The first communication apparatus according to claim 12, wherein the time unit decoder is further configured to obtain a sequence repetition period from the parameter.

15. A communication method, comprising:
in a first communication apparatus:
  receiving a parameter from a second communication apparatus, wherein the parameter is received during communication in a synchronous mode with the second communication apparatus;
  holding the received parameter; and
  determining to reflect the parameter at a timing at which a specific command is transmitted from the second communication apparatus.

16. A non-transitory computer-readable medium having stored thereon, computer-executable instructions which, when executed by a computer of a first communication apparatus, cause the computer to execute operations, the operations comprising:
  receiving a parameter from a second communication apparatus, wherein the parameter is received during communication in a synchronous mode with the second communication apparatus;
  holding the received parameter; and
  determining to reflect the parameter at a timing at which a specific command is transmitted from the second communication apparatus.

* * * * *